(12) United States Patent
Katayama

(10) Patent No.: US 8,045,442 B2
(45) Date of Patent: Oct. 25, 2011

(54) OPTICAL INFORMATION RECORDING/ REPRODUCING DEVICE AND OPTICAL INFORMATION RECORDING/ REPRODUCING METHOD

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 586 days.

(21) Appl. No.: 12/092,924

(22) PCT Filed: Nov. 7, 2006

(86) PCT No.: PCT/JP2006/322164
§ 371 (c)(1),
(2), (4) Date: May 7, 2008

(87) PCT Pub. No.: WO2007/055196
PCT Pub. Date: May 18, 2007

(65) Prior Publication Data
US 2009/0252011 A1    Oct. 8, 2009

(30) Foreign Application Priority Data

Nov. 8, 2005 (JP) .................................. 2005-323920
Nov. 2, 2006 (JP) .................................. 2006-298453

(51) Int. Cl.
*G11B 7/00* (2006.01)
(52) U.S. Cl. .................................................. 369/112.02
(58) Field of Classification Search ........................ None
See application file for complete search history.

(56) References Cited

U.S. PATENT DOCUMENTS 6,661,415 B1 * 12/2003 Yasuda et al. ................. 345/213
7,428,193 B2 * 9/2008 Ogasawara ................. 369/44.23
7,599,276 B2 * 10/2009 Katayama ................. 369/112.19
(Continued)

FOREIGN PATENT DOCUMENTS
JP          9-81942          3/1997
(Continued)

OTHER PUBLICATIONS

United States Office Action for U.S. Appl. No. 12/444,202 dated Dec. 28, 2010.

*Primary Examiner* — Joseph Haley
(74) *Attorney, Agent, or Firm* — Scully, Scott, Murphy & Presser, P.C.

(57) ABSTRACT

An optical information recording/reproducing device includes a liquid optical element containing a liquid crystal polymer layer in an optical head. A liquid crystal optical element drive unit drives a liquid crystal optical element having a first pattern electrode divided into a plurality of region at one side of the liquid crystal polymer layer in the optical axis direction. The first pattern electrode includes a first region arranged to surround the optical axis and second to ninth regions arranged outside the first regions in such a manner that the circumference is divided eight portions. The liquid crystal optical element drive unit applies a first effective voltage to the first region, a second effective voltage to the second and the sixth region, a third effective voltage to the third and the seventh region, a fourth effective voltage to the fourth and the eighth region, and a fifth effective voltage to the fifth and the ninth region. An average value of the second and the fourth effective voltage and an average value of the third and the fifth effective voltage are identical to the first effective voltage. The voltage applied to the respective regions of the pattern region of the liquid crystal optical element is decided in a short time so as to optimize the quality of the reproduction signal.

4 Claims, 23 Drawing Sheets

U.S. PATENT DOCUMENTS

| | | | |
|---|---|---|---|
| 7,773,489 B2 * | 8/2010 | Murata et al. | 369/112.02 |
| 7,792,004 B2 * | 9/2010 | Hamaoka et al. | 369/112.02 |
| 2005/0088950 A1 | 4/2005 | Tanimoto | |
| 2005/0199778 A1 | 9/2005 | Kadowaki et al. | |
| 2006/0158989 A1 | 7/2006 | Kim et al. | |

FOREIGN PATENT DOCUMENTS

| | | |
|---|---|---|
| JP | 11-219529 | 8/1999 |
| JP | 2000-40249 | 2/2000 |
| JP | 2000-67453 | 3/2000 |
| JP | 2001-273663 | 10/2001 |
| JP | 2002-14314 | 1/2002 |
| JP | 2003-51130 | 2/2003 |
| JP | 2003-338070 | 11/2003 |
| JP | 2005-202323 | 7/2005 |
| JP | 2005-317106 | 11/2005 |
| JP | 2005-353187 | 12/2005 |

* cited by examiner

Fig. 6

| REGION | VOLTAGE |
|--------|---------|
| 19a | V1 |
| 19b | $V1 + V\alpha + V\beta$ |
| 19c | $V1 - V\alpha + V\beta$ |
| 19d | $V1 - V\alpha - V\beta$ |
| 19e | $V1 + V\alpha - V\beta$ |
| 19f | $V1 + V\alpha + V\beta$ |
| 19g | $V1 - V\alpha + V\beta$ |
| 19h | $V1 - V\alpha - V\beta$ |
| 19i | $V1 + V\alpha - V\beta$ |

Fig. 10

| REGION | VOLTAGE |
|--------|---------|
| 19a | $V1$ |
| 19j | $V1+V\alpha$ |
| 19k | $V1+V\beta$ |
| 19l | $V1-V\alpha$ |
| 19m | $V1-V\beta$ |
| 19n | $V1+V\alpha$ |
| 19o | $V1+V\beta$ |
| 19p | $V1-V\alpha$ |
| 19q | $V1-V\beta$ |

Fig. 13

| REGION | VOLTAGE | REGION | VOLTAGE |
|---|---|---|---|
| 20a | V1 | | |
| 20b | V1+Vα+Vβ | 21b | V1+K·Vα+K·Vβ |
| 20c | V1−Vα+Vβ | 21c | V1−K·Vα+K·Vβ |
| 20d | V1−Vα−Vβ | 21d | V1−K·Vα−K·Vβ |
| 20e | V1+Vα−Vβ | 21e | V1+K·Vα−K·Vβ |
| 20f | V1+Vα+Vβ | 21f | V1+K·Vα+K·Vβ |
| 20g | V1−Vα+Vβ | 21g | V1−K·Vα+K·Vβ |
| 20h | V1−Vα−Vβ | 21h | V1−K·Vα−K·Vβ |
| 20i | V1+Vα−Vβ | 21i | V1+K·Vα−K·Vβ |

Fig.15

| REGION | VOLTAGE | REGION | VOLTAGE |
|---|---|---|---|
| 20a | $V1$ | | |
| 20j | $V1+V\alpha$ | 21j | $V1+K\cdot V\alpha$ |
| 20k | $V1+V\beta$ | 21k | $V1+K\cdot V\beta$ |
| 20l | $V1-V\alpha$ | 21l | $V1-K\cdot V\alpha$ |
| 20m | $V1-V\beta$ | 21m | $V1-K\cdot V\beta$ |
| 20n | $V1+V\alpha$ | 21n | $V1+K\cdot V\alpha$ |
| 20o | $V1+V\beta$ | 21o | $V1+K\cdot V\beta$ |
| 20p | $V1-V\alpha$ | 21p | $V1-K\cdot V\alpha$ |
| 20q | $V1-V\beta$ | 21q | $V1-K\cdot V\beta$ |

| REGION | VOLTAGE |
|--------|---------|
| 22a | V2 |
| 22b | V2−Vγ |
| 22c | V2+Vγ |
| 22d | V2+Vγ |
| 22e | V2−Vγ |

Fig. 20A
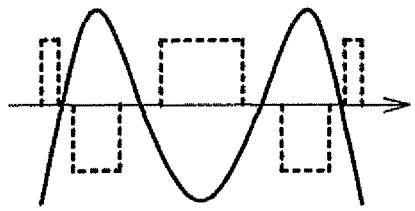
Fig. 20C
Fig. 20B
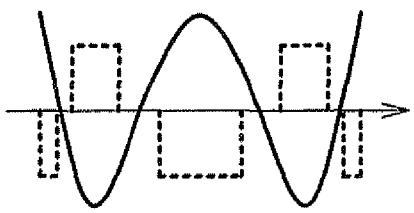
Fig. 20D
Fig. 21
| REGION | VOLTAGE |
| --- | --- |
| 22f | V3+Vδ |
| 22g | V3 |
| 22h | V3−Vδ |
| 22i | V3 |
| 22j | V3+Vδ |

Fig. 30  Prior Art

|  | REGION 35a | REGION 35b, 35f | REGION 35c, 35g | REGION 35d, 35h | REGION 35e, 35i |
|---|---|---|---|---|---|
| DRIVE PATTERN A | Vc | Vb | Va | Va | Vb |
| DRIVE PATTERN B | Vc | Vb | Vc | Va | Vc |
| DRIVE PATTERN C | Vc | Vb | Vb | Va | Va |
| DRIVE PATTERN D | Vc | Vc | Vb | Vc | Va |
| DRIVE PATTERN E | Vc | Va | Vb | Vb | Va |
| DRIVE PATTERN F | Vc | Va | Vc | Vb | Vc |
| DRIVE PATTERN G | Vc | Va | Va | Vb | Vb |
| DRIVE PATTERN H | Vc | Vc | Va | Vc | Vb |
| DRIVE PATTERN I | Vc | Vc | Vc | Vc | Vc |

US 8,045,442 B2

OPTICAL INFORMATION RECORDING/REPRODUCING DEVICE AND OPTICAL INFORMATION RECORDING/REPRODUCING METHOD

TECHNICAL FIELD

The present invention relates to an optical information recording/reproducing apparatus and an optical information recording/reproducing method for performing recording and reproduction on an optical recording medium.

BACKGROUND ART

The recording density of an optical recording medium is inversely proportional to the square of the diameter of the focused spot formed on the optical recording medium by an optical head incorporated within an optical information recording/reproducing apparatus that performs recording or reproduction on the optical recording medium. That is, a smaller focused spot diameter results in higher recording density. The focused spot diameter is proportional to the wavelength of the light source in the optical head and inversely proportional to the numeric aperture of the objective lens. That is, a shorter wavelength of the light source and higher numeric aperture of the objective lens result in a smaller focused spot diameter.

An optical system of an optical head suffers from various types of aberration, such as astigmatism, coma aberration, and spherical aberration, due to manufacturing error and adjustment error of optical components. For example, misalignment between the center of the incidence surface of the objective lens and the center of the exit surface thereof causes astigmatism and coma aberration, and deviation of the spacing between the incidence surface and exit surface of the objective lens from design causes spherical aberration. The occurrence of the various types of aberration in the optical system of the optical head results in a disturbed shape of the focused spot and deteriorated recording/reproducing characteristics. The astigmatism, coma aberration, and spherical aberration are inversely proportional to the wavelength of the light source, and proportional to the square, cube, and fourth-power, respectively, of the numeric aperture of the objective lens. Thus, a shorter wavelength of the light source and higher numeric aperture of the objective lens result in a narrower margin of the various types of aberrations for the recording/reproducing characteristics. Therefore, an optical information recording/reproducing apparatus provided with a light source of a shortened wavelength and an objective lens of an increased numeric aperture for improved recording density requires correction of the various types of aberration occurring in the optical system of the optical head in order to prevent deterioration in the recording/reproducing characteristics.

Known as conventional optical heads capable of correcting various types of aberration are optical heads provided with a liquid crystal optical element for correcting various types of aberration. Among them, an example of the conventional optical heads provided with a liquid crystal optical element for correcting astigmatism is described in Japanese Laid-Open Patent Application No. JP-A 2000-40249. FIG. 28 shows the configuration of the optical head disclosed in Japanese Laid-Open Patent Application No. JP-A 2000-40249. This optical head includes: a semiconductor laser 26, a polarizing beam splitter 27, a liquid crystal optical element 28, a quarter-wave plate 29, an objective lens 30, a convex lens 32, and a photo-detector 33. Light emitted from the semiconductor laser 26 serving as a light source is made incident as P-polarized light on the polarizing beam splitter 27, and is transmitted therethrough almost completely, and then outputted to the liquid crystal optical element 28. The liquid crystal optical element 28 transmits the incident light and outputs it to the quarter-wave plate 29. The quarter-wave plate 29 converts the transmitted light from linear polarized light into circular polarized light. The light transmitted through the quarter-wave plate 29 is focused on a disk 31 serving as an optical recording medium by the objective lens 30. The light reflected on the disk 31 is transmitted backward through the objective lens 30, and made incident on the quarter-wave plate 29. The quarter-wave plate 29 converts the transmitted light from the circular polarized light into linear polarized light whose polarization direction is orthogonal to that on the forward path. The light converted into the linear polarized light is transmitted backward through the liquid crystal optical element 28, and is made incident as S-polarized light on the polarizing beam splitter 27. The polarizing beam splitter 27 reflects the incident light almost completely and outputs it to the convex lens 32. The light transmitted through the convex lens 32 is received by the photo-detector 33.

The liquid crystal optical element 28 is structured to have liquid crystal polymer sandwiched between two substrates. A pattern electrode 34 is formed on a surface of one of the substrates on the liquid crystal polymer side, and an entire surface electrode is formed on a surface of the other substrate on the liquid crystal polymer side. FIG. 29 is a plan view of the pattern electrode 34 of the liquid crystal optical element 28. The pattern electrode 34 is divided into nine regions. Specifically, the pattern electrode 34 is divided into: a circular region 35a with the optical axis as center; regions 35b to 35i which are located outside of the region 35a and divided by four straight lines passing through the optical axis in units of 45 degrees in accordance with the angle around the optical axis. A dotted line in the figure indicates the effective diameter of the objective lens 30.

FIG. 30 shows relationship between the regions of the pattern electrode 34 of the liquid crystal optical element 28 and voltages respectively applied to these regions. Nine drive patterns, drive pattern A to drive pattern I, are available for the liquid crystal optical element 28. As shown in FIG. 30, selected one of drive voltages Va, Vb, and Vc is applied to each of the regions 35a to 35i, in accordance with the respective drive pattern. Here, Va>Vc>Vb, and Va−Vc=Vc−Vb=V. The transmitted light through the region(s) fed with the drive voltage Va is advanced in phase with respect to the transmitted light through the region(s) fed with the drive voltage Vc. The transmitted light through the region(s) fed with the drive voltage Vb is delayed in phase with respect to the transmitted light through the region(s) fed with the drive voltage Vc.

The drive pattern A advances the phase of the light transmitted through the regions 35c, 35d, 35g, and 35h with respect to the light transmitted through the region 35a, and delays the phase the light transmitted through the regions 35b, 35e, 35f, and 35i with respect to the light transmitted through the region 35a. On the other hand, the drive pattern E delays the phase of the light transmitted through the regions 35c, 35d, 35g, and 35h with respect to the light transmitted through the region 35a, and advances the phase of the light transmitted through the regions 35b, 35e, 35f, and 35i with respect to the light transmitted through the region 35a. Therefore, the use of the drive patterns A or E successfully provides correction of the astigmatism between the 0° direction and the 90° direction. The sign of correctable astigmatism is opposite between the drive patterns A and E.

The drive pattern C advances the phase of the light transmitted through the regions 35d, 35e, 35h, and 35i with respect to the light transmitted through the region 35a, and delays the phase of the light transmitted through the regions 35b, 35c, 35f, and 35g with respect to the light transmitted through the region 35a. On the other hand, the drive pattern G advances the phase of the light transmitted through the regions 35d, 35e, 35h, and 35i with respect to the light transmitted through the region 35a, and delays the phase of the light transmitted through the regions 35b, 35c, 35f, and 35g with respect to the light transmitted through the region 35a. Therefore, the drive patterns C and G provide correction of the astigmatism between the 45° direction and the 135° direction. The sign of correctable astigmatism is opposite between the drive patterns C and G.

The drive pattern D advances the phase of the light transmitted through the regions 35e and 35i with respect to the light transmitted through the region 35a, and delays the phase of the light transmitted through the regions 35c and 35g with respect to the light transmitted through the region 35a. On the other hand, the drive pattern H delays the phase of the light transmitted through the regions 35e and 35i with respect to the light transmitted through the region 35a, and advances the phase of the light transmitted through the regions 35c and 35g with respect to the light transmitted through the region 35a. Therefore, the drive patterns D and H provide correction of the astigmatism between 22.5° direction and 112.5° direction. The sign of correctable astigmatism is opposite between the drive patterns D and H.

The drive pattern B advances the phase of the light transmitted through the regions 35d and 35h with respect to the light transmitted through the region 35a, and delays the phase of the light transmitted through the regions 35b and 35f with respect to the light transmitted through the region 35a. On the other hand, the drive pattern F delays the phase of the light transmitted through the regions 35d and 35h with respect to the light transmitted through the region 35a, and delays the phase of the light transmitted through the regions 35b and 35f with respect to the light transmitted through the region 35a. Therefore, the drive patterns D and H provide correction of the astigmatism between 67.5° direction and 157.5° direction. The sign of correctable astigmatism is opposite between the drive patterns B and F.

The absolute amount of astigmatism correctable with the drive patterns A to H increases with the increase in the value of the voltage V. It should be noted that the drive pattern I does not provide astigmatism correction.

The correction of astigmatism with the liquid crystal optical element 28 requires selecting any of the drive patterns A to I in accordance with the direction of astigmatism to be corrected, and determining the level of voltage V in accordance with the amount of astigmatism to be corrected, so that the quality evaluation index of the reproduced signal from the optical recording medium is best improved. Japanese Laid Open Patent Application No. JP-A 200-40249 discloses two methods as methods of determining which of the drive patterns A to I is to be used and determining the value of voltage V.

The first method involves measuring the jitter of the reproduced signal and selecting the combination of the drive pattern and the value of the voltage V so that the jitter is minimized. Eight drive patterns A to H are preliminary prepared for the drive pattern, and about 32 types of voltage values are previously prepared for the voltage V. For all the combinations, the jitter of the reproduced signal is measured, and the combination of the drive pattern and the voltage V is selected so as to minimize the jitter.

A second method involves measuring the amplitude of the reproduced signal and selecting the drive pattern so that the jitter is minimized. Eight drive patterns A to H are previously prepared for the drive pattern, about 16 types of voltage values are previously prepared for the voltage V. First, the voltage V is fixed at any one of about the 16 types of voltage values, and the amplitude of the reproduced signal, which is one of the quality evaluation indexes of the reproduced signal, is measured for all the eight drive patterns. The drive pattern is selected so that the measured amplitude of the reproduced signal is minimized. Next, the amplitude of the reproduced signal is measured for all the about 16 types of voltage V with the selected one of the eight types of drive patterns fixed. From among them, the voltage V is selected so that the amplitude of the reproduced signal is maximized.

The first method allows selecting the optimum combination of the drive pattern and voltage V which offers the best quality evaluation index of the reproduced signal. However, the first method requires long time to select the combination of the drive pattern and voltage V. On the other hand, the second method allows selecting the combination of the drive pattern and voltage V in short time. However, the second method does not necessary select the optimum combination of the drive pattern and voltage V which provides the best quality evaluation index of the reproduced signal.

In connection with the above, Japanese Laid Open Patent Application No. JP-A 2001-273663 discloses an aberration correction device. The conventional aberration correction device corrects aberration occurring on the optical path of an optical system that irradiates an optical beam to a recording medium and then guides the optical beam reflected by the recording medium. This aberration correction device includes: a liquid crystal unit provided with a first electrode layer including a plurality of divided electrodes electrically separated from each other in the same plane, a second electrode layer, and a liquid crystal element which is provided between the first and second electrode layers to cause a phase change in the light passing therethrough in accordance with the applied electric field; a detector which receives a reflected optical beam traveling through the liquid crystal unit to generate a detection signal; a voltage generator which generates voltages respectively applied to the plurality of divided electrodes; and a controller which controls aberration correction by, with the voltage applied to the predetermined divided electrode of the first electrode layer being defined as a reference voltage, changing the voltages applied to the other divided electrodes. The controller defines the reference voltage based on the change in the magnitude of the detection signal for the change of the voltages respectively applied to the plurality of divided electrodes.

Moreover, Japanese Laid Open Patent Application No. JP-A 2002-14314 discloses an optical recording/reproducing device. The conventional optical recording/reproducing device includes: a voltage application electrode having a segment electrode part composed of a plurality of segment electrodes, a voltage control part formed of a conductive material and generating voltages applied to the plurality of segment electrodes by dividing an externally applied voltage by resistors of conductive material, a conduction part connecting together the segment electrode part and the voltage control part, and an insulation part preventing short-circuit between the conduction part; an opposite electrode arranged in substantially parallel to the voltage application electrode and opposed to the voltage application electrode; and a phase change layer formed of a phase changing material arranged between the voltage application electrode and the opposite electrode. The phase of light incident on the phase change layer is changed by changing the difference in the voltage between the plurality of segment electrodes and the opposite electrode.

Moreover, Japanese Laid-Open Patent Application No. JP-A 2003-338070 discloses an optical head device. In this conventional example, the optical head device includes: a light source; an objective lens for focusing the light emitted from the light source onto an optical recording medium; a phase correction element provided between the light source and the objective lens to change the wavefronts of the emitted light; and control voltage generating means outputting a wavefront-changing voltage to the phase correction element. The phase correction element includes: a pair of transparent substrates with transparent electrodes formed on the surfaces thereof; and a liquid crystal layer sandwiched between the transparent substrates. Formed on the surface of at least one of the transparent substrates are: a coma aberration correction electrode which is a transparent electrode for correcting coma aberration or a spherical aberration correction electrode which is a transparent electrode for correcting spherical aberration; and an astigmatism correction electrode which is a transparent electrode for correcting astigmatism. Each of the transparent electrodes is divided into several segments.

DISCLOSURE OF THE INVENTION

An object of the present invention is to provide an optical information recording/reproducing apparatus and an optical information recording/reproducing method for determining voltages to be applied to respective regions of a pattern electrode of a liquid crystal element in short time so that the quality of the reproduced signal is best improved.

In an aspect of the present invention, an optical information recording/reproducing apparatus is provided with an optical head and a liquid crystal optical element drive unit. The optical head includes a light source, an objective lens focusing an emitted light emitted from the light source on an optical recording medium, a photo-detector receiving a reflected light generated by the emitted light being reflected by the optical recording medium, light splitting means of splitting forward light directed from the light source to the objective lens and backward light directed from the objective lens to the photo-detector, and a liquid crystal optical element which is provided in a light path of the forward light and includes a liquid crystal polymer layer extending perpendicularly to an optical axis. Said liquid crystal optical element includes a first pattern electrode provided on one side of the liquid crystal polymer layer in the optical axis direction and divided into a plurality of regions, and the liquid crystal optical element drive unit drives this liquid crystal optical element. The first pattern electrode includes: a first region provided to surround the optical axis, a set of eight partition regions provided outside the first regions and defined so as to divide a circumference into eight segments with respect to the optical axis. This set of eight partition regions are referred to as second to ninth regions in order. The second to ninth regions are preferably provided to in such a manner as to divide the circumference around the optical axis into eight equal segments. The liquid crystal element drive unit applies voltages to the respective regions of the first pattern electrode as follows: The liquid crystal element drive unit applies a first effective voltage to the first region, a second effective voltage to the second and sixth regions, a third effective voltage to the third and seventh regions, a fourth effective voltage to the fourth and eighth regions, and a fifth effective voltage to the fifth and ninth regions. These applied voltages hold the following relation: The average of the second and fourth effective voltages and the average of the third and fifth effective voltages are equal to the first effective voltage.

In the present invention, the first pattern electrode may further include a second set of eight partition regions which are provided outside the second to ninth regions and defined so as to divide a circumference into eight segments. The second set of eight partition regions are refereed to as tenth to seventeenth regions in order. The tenth to seventeenth regions are preferably arranged to divide the circumference into eight equal segments. The liquid crystal element driver unit further drives the liquid crystal optical element as follows: The liquid crystal element driver unit applies a sixth effective voltage to the tenth and fourteenth regions, a seventh effective voltage to the eleventh and fifteenth regions, an eighth effective voltage to the twelfth and sixteenth regions, and a ninth effective voltage to the thirteenth and seventeenth regions.

These applied voltages satisfy the relation as follows: The average of the sixth and eighth effective voltages and the average of the seventh and ninth voltages are equal to the first effective voltage. the difference between the sixth and first effective voltages is K times the difference between the second and the first effective voltages, where K is a constant larger than one. The difference between the seventh and first effective voltages is K times the difference between the third and first effective voltages. The difference between the eighth and first effective voltages is K times the difference between the fourth and first effective voltages. The difference between the ninth and first effective voltages is K times the difference between the fifth and first effective voltages.

In the present invention, the liquid crystal optical element may further includes a second pattern electrode, provided on another side of the liquid crystal polymer layer in the optical axis direction, positioned opposed to the first pattern electrode, and divided into a plurality of regions. The second pattern electrode is divided into eighteenth to twenty-second regions. The eighteenth and nineteenth regions are provided apart from each other in an island structure at positions in symmetry with respect to a straight line passing through the optical axis and directed in a predetermined direction. The twentieth region is provided outside the eighteenth and nineteenth regions to surround the eighteenth and nineteenth regions. The twenty-first and twenty-second regions are provided outside the twentieth region approximately in symmetry with the straight line on a same side of the eighteenth and nineteenth regions with respect to the straight line. The liquid crystal element drive unit further applies a tenth effective voltage to the twentieth region, an eleventh effective voltage to the eighteenth and twenty-second regions, and a twelfth effective voltage to the nineteenth and twenty first regions. The average of the eleventh and twelfth effective voltages is equal to the tenth effective voltage.

In the present invention, the liquid crystal optical element may further include a third pattern electrode provided on another side of the liquid crystal polymer layer in the optical axis direction, positioned opposed to the first pattern electrode, and divided into eighteenth and twenty-second regions arranged in order from inside to outside to surround the optical axis. In this case, the liquid crystal element drive unit applies a thirteenth effective voltage to the nineteenth and twenty-first regions, a fourteenth effective voltage to the twentieth region, and a fifteenth effective voltage to the eighteenth and twenty-second regions. The average of the fourteenth and fifteenth effective voltages is equal to the thirteenth effective voltage.

In another aspect of the present invention, an optical information recording/reproducing method includes a driving step, a reproduction step, and a control step. In the driving step, a liquid crystal optical element is driven which is disposed in an optical path of forward light within an optical head, provided with a liquid crystal polymer layer extending perpendicularly to an optical axis and including a first pattern electrode positioned on one side of the liquid crystal polymer layer in the optical axis direction. In the reproducing step, a reproduced signal is generated based on backward light reflected by an optical recording medium. In the control step, the drive of the liquid crystal optical element in the driving step is controlled so that a quality evaluation index of the reproduced signal is best improved. The first pattern electrode includes: a first region provided to surround the optical axis, a set of eight partition regions provided outside the first regions and defined so as to divide a circumference into eight segments with respect to the optical axis. The set of eight partition regions are referred to as second to ninth regions in order. The second to ninth regions are preferably arranged to divide the circumference around the optical into eight equal segments. The driving step includes: a step of applying an effective voltage of V1 to the first region, a step of applying an effective voltage to the second and sixth regions; a step of applying an effective voltage to the third and seventh regions; a step of applying an effective voltage to the fourth and eighth regions; and a step of applying an effective voltage of V1+V$\alpha$−V$\beta$ to the fifth and ninth regions.

In the present invention, the first pattern electrode may further include: a second set of eight partition regions which are provided outside the second to ninth regions and defined so as to divide a circumference into eight segments. The second set of eight partition regions are referred to as tenth to seventeenth regions in order. The tenth to seventeenth regions are preferably arranged to divide the circumference around the optical axis into eight equal segments. The driving step further includes: a step of applying an effective voltage to the tenth and fourteenth regions, a step of applying an effective voltage to the eleventh and fifteenth regions, a step of applying an effective voltage to the twelfth and sixteenth regions; and a step of applying an effective voltage to the thirteenth and seventeenth regions, where K is a constant larger than one.

The first pattern electrode may include: a first region provided to surround the optical axis, a set of eight partition regions provided outside the first regions and defined so as to divide a circumference into eight segments with respect to the optical axis. This set of eight partition regions are referred to as second to ninth regions in order. The second to ninth regions are preferably provided to in such a manner as to divide the circumference around the optical axis into eight equal segments. In this case, the driving step includes: a step of applying a first effective voltage to the first region, a step of applying a second effective voltage to the second and sixth regions, a step of applying a third effective voltage to the third and seventh regions, a step of applying a fourth effective voltage to the fourth and eighth regions, and a step of applying a fifth effective voltage to the fifth and ninth regions.

In the present invention, the first pattern electrode may further include a second set of eight partition regions which are provided outside the second to ninth regions and defined so as to divide a circumference into eight segments. The second set of eight partition regions are referred to as tenth to seventeenth regions in order. The tenth to seventeenth region are preferably arrange so as to divide the circumference around the optical axis into eight equal segments. In this case, the driving step further includes: a step of applying an effective voltage to the tenth and fourteenth regions, a step of applying an effective voltage to the eleventh and fifteenth regions, a step of applying an effective voltage to the twelfth and sixteenth regions, and a step of applying an effective voltage of V1−K·V$\beta$ to the thirteenth and seventeenth regions, where K is a constant larger than one.

In the present invention, the control step may include: a step of determining an optimum value of the voltage V$\alpha$ with the voltage V$\beta$ fixed at a predetermined value so that the quality evaluation index is best improved, and a step of determining an optimum value of the voltage V$\beta$ with the voltage V$\alpha$ fixed at a predetermined value so that the quality evaluation index is best improved.

In the present invention, the liquid crystal optical element may further includes a second pattern electrode provided on another side of the liquid crystal polymer layer in the optical axis direction, positioned opposed to the first pattern electrode, and divided into a plurality of regions. The second pattern electrode includes: eighteenth and nineteenth regions provided apart from each other in an island structure at positions in symmetry with respect to a straight line passing through the optical axis and directed in a predetermined direction, a twentieth region provided outside the eighteenth and nineteenth regions to surround the eighteenth and nineteenth regions, and twenty-first and twenty-second regions provided outside the twentieth region approximately in symmetry with the straight line on a same side of the eighteenth and nineteenth regions with respect to the straight line. The driving step further includes a step of applying an effective voltage of V2 to the twentieth region, a step of an effective voltage of V2−V$\gamma$ to the eighteenth and twenty-second regions, and a step of applying an effective voltage of V2−V$\gamma$ to the nineteenth and twenty first regions, where V2 is a second reference voltage value different from said first reference value, and V$\gamma$ is a third voltage value.

In the present invention, the control step further includes a step of determining an optimum value of the voltage V$\gamma$ with the voltages V$\alpha$ and V$\beta$ fixed at predetermined values, so that the quality evaluation index is best improved.

In the present invention, the liquid crystal optical element may further includes a third pattern electrode provided on another side of the liquid crystal polymer layer in the optical axis direction, positioned opposed to the first pattern electrode, and divided into eighteenth and twenty-second regions provided in order from inside to outside to surround the optical axis. The driving step further includes a step of applying an effective voltage of V3 to the nineteenth and twenty-first regions, a step of applying an effective voltage to the twentieth region, and a step of applying an effective voltage of V3+V$\delta$ to the eighteenth and twenty-second regions.

In the present invention, the control step may further include a step of determining an optimum value of the voltage V$\delta$ with the voltages V$\alpha$ and V$\beta$ fixed at predetermined values, so that the quality evaluation index is best improved. Further, the quality evaluation index is preferably any of an amplitude, a jitter, a PRSNR, and an error rate of a reproduced signal.

Wave aberration caused by astigmatism of an arbitrary direction and amount is expressed by a quadratic function of X and Y, with an assumption that X and Y axes are defined in the radial direction and tangential direction of an optical recording medium, respectively. A general form of the quadratic function of X and Y is given as $AX^2+2BXY+CY^2$ (where A, B, and C are constants). Therefore, correction of the aberration for which the wave aberration is expressed by this formula allows correction of the astigmatism of an arbitrary direction and amount. This formula can be modified into $(A+C)(X^2+Y^2)/2+(A-C)(X^2-Y^2)/2+2BXY$, where $(X^2+Y^2)$ denotes wave aberration caused by defocus aberration, $(X^2-Y^2)$ denotes wave aberration caused by astigmatism between the 0° and 90° directions, and 2XY denotes wave aberration caused by astigmatism between the 45° and 135° directions.

The defocus aberration is automatically corrected by focus servo, and therefore the correction of the astigmatism of an arbitrary direction and amount can be achieved by simultaneously correct the astigmatism between the 0° and 90° directions and the astigmatism between the 45° and 135° directions with the liquid crystal optical element. Here, (A−C)/2 and B are independent from each other, where (A−C)/2 is the coefficient of $(X^2-Y^2)$ and B is the coefficient of 2XY. Thus, a change in the amount of one of the astigmatism between the 0° and 90° directions and the astigmatism between the 45° and 135° directions does not result in a change in the amount of the other astigmatism.

In the optical information recording/reproducing apparatus and the optical information recording/reproducing method according to the present invention, a change in the voltage Vα causes a change in the correction amount of astigmatism between 0° and 90° directions, while a change in the voltage Vβ causes a change in the correction amount of astigmatism between 45° and 135° directions. Therefore, determining the voltage Vα with the voltage Vβ fixed so that the quality evaluation index of the reproduced signal is best improved allows obtaining the optimum correction amount for the astigmatism between the 0° and 90° directions so that remaining wave aberration caused by this aberration is minimized. Moreover, determining the voltage Vβ with the voltage Vα fixed so that the quality evaluation index of a reproduced signal is best improved allows obtaining the optimum correction amount for the astigmatism between the 45° and 135° directions such that remaining wave aberration caused by this aberration is minimized.

A change in the amount of one of the astigmatism between the 0° and 90° directions and the astigmatism between 45° and 135° directions does not result in a change in the amount of the other astigmatism. Thus, the voltage Vα such that the quality evaluation index of the reproduced signal is best improved (the optimum voltage Vα0) does not depend on the voltage Vβ, and the voltage Vβ such that the quality evaluation index of the reproduced signal is best improved (optimum voltage Vβ0) does not depend on the voltage Vα. Therefore, whichever of the step for determining the optimum voltage Vα0 with the Vβ fixed and the step for determining the optimum voltage Vβ0 with the Vα fixed is carried out first, the same combination of the optimum voltages Vα0 and Vβ0 is determined.

After the determination of the optimum voltages Vα0 and Vβ0, the aforementioned drive voltages are respectively applied to the regions of the pattern electrode of the liquid crystal optical element on the basis of this combination. This allows simultaneously minimizing the remaining wave aberration caused by the astigmatism between 0° and 90° directions and the remaining wave aberration caused by the astigmatism between the 45° and 135° directions. That is, the correction of the astigmatism of an arbitrary direction and amount is achieved. In this case, the quality of the reproduced signal from the optical recording medium is best improved. Furthermore, in determining the combination of the optimum voltages Vα0 and Vβ0, the quality evaluation index of the reproduced signal is only measured for all the voltages Vα with the voltage Vβ fixed and for all the voltages Vβ with the voltage Vβ fixed, not for all the combinations of the voltages Vα and the voltage Vβ. Thus, the combination of the optimum voltages Vα0 and Vβ0 is determined in a short time.

The present invention allows providing an optical information recording/reproducing apparatus and an optical information recording/reproducing method which determine in a short time voltages applied to the respective regions of the pattern electrode of the liquid crystal optical element for correcting astigmatism so that the quality of a reproduced signal is best improved. This is because astigmatism of an arbitrary direction and amount is corrected through independently correcting the astigmatism between the 0° and 90° directions and the astigmatism between the 45° and 135° directions.

BRIEF DESCRIPTION OF THE DRAWINGS

FIG. 6 is a diagram showing the relationship between regions of the pattern electrode of the liquid crystal optical element for correcting astigmatism and applied voltages in the first exemplary embodiment;

FIG. 10 is a diagram showing the relationship between regions of the pattern electrode of the liquid crystal optical element for correcting astigmatism and applied voltages in the second exemplary embodiment;

FIG. 13 is a diagram showing relationship between regions of the pattern electrode of the liquid crystal optical element for correcting astigmatism and applied voltages in the third exemplary embodiment;

FIG. 15 is a diagram showing relationship between regions of the pattern electrode of the liquid crystal optical element for correcting astigmatism and applied voltages in the fourth exemplary embodiment;

FIGS. 20A to 20D are diagrams showing wave aberration when spherical aberration is corrected by the liquid crystal optical element in the sixth exemplary embodiment of the present invention;

FIG. 21 is a diagram showing relationship between regions of the pattern electrode of the liquid crystal optical element for correcting spherical aberration and applied voltages in the sixth exemplary embodiment;

FIG. 30 is a diagram showing relationship between regions of the pattern electrode of the liquid crystal optical element for correcting astigmatism and applied voltages in the conventional optical head.

BEST MODES FOR CARRYING OUT THE INVENTION

Hereinafter, exemplary embodiments of the present invention will be described with reference to the drawings.

Figure 23:
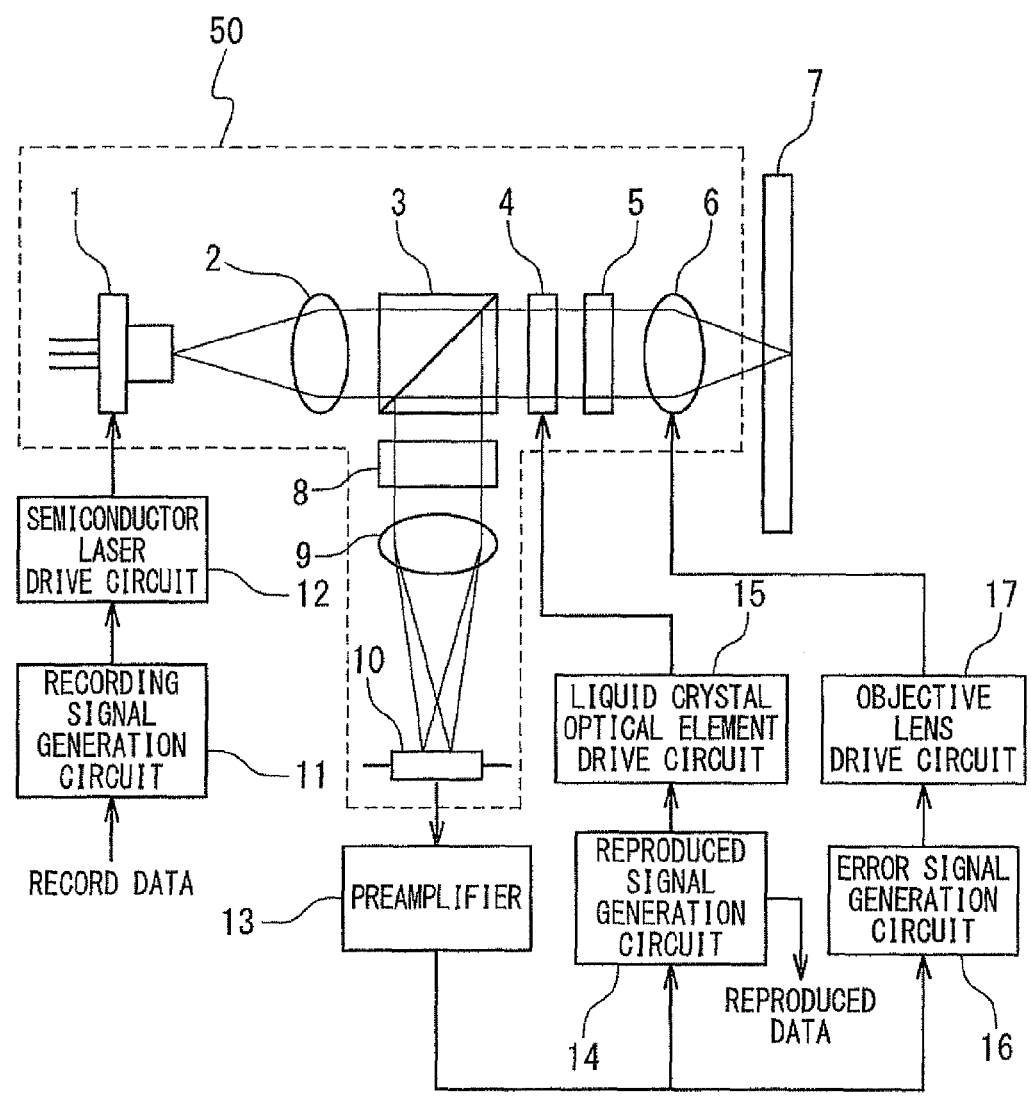
FIG. 23 is a diagram showing a configuration of the optical information recording/reproducing apparatus according to the exemplary embodiments of the present invention.

FIG. 23 shows the configuration of an optical information recording/reproducing apparatus according to exemplary embodiments of the present invention. The optical information recording/reproducing apparatus includes: a recording signal generation circuit 11; a semiconductor laser drive circuit 12; a preamplifier 13; a reproduced signal generation circuit 14; a liquid crystal optical element drive circuit 15; an error signal generation circuit 16; an objective lens drive circuit 17; and an optical head 50.

The recording signal generation circuit 11 generates a recording signal for driving the optical head 50 on the basis of recording data inputted externally and outputs the recording signal to the semiconductor laser drive circuit 12. The semiconductor laser drive circuit 12 drives a semiconductor laser 1 included within the optical head 50 on the basis of the recording signal received from the recording signal generation circuit 11. This achieves signal recording on a disk 7. Details of the optical head 50 will be described later. On the other hand, the preamplifier 13 converts a current signal received from a photo-detector 10 included within the optical head 50 into a voltage signal. The reproduced signal generation circuit 14 generates a reproduced signal for driving a liquid crystal optical element 4 included within the optical head 50 on the basis of the voltage signal received from the preamplifier 13, and externally outputs reproduced data. This achieves signal reproduction from the disk 7. The liquid crystal optical element drive circuit 15 drives the liquid crystal optical element 4 included in the optical head 50 on the basis of the reproduced signal inputted from the reproduced signal generation circuit 14, so that the quality evaluation index of the reproduced signal is best improved. As a result, various aberration correction operations are performed. Moreover, the error signal generation circuit 16 generates a focus error signal and a truck error signal for driving an objective lens 6 on the basis of the voltage signal received from the preamplifier 13. The objective lens drive circuit 17 drives the objective lens 6 by an actuator (not shown) on the basis of the focus error signal and truck error signal inputted from the error signal generation circuit 16 so that the focus error signal and the truck error signal are reduced to zero. This achieves focus servo and truck servo operations. In addition, the optical information recording/reproducing apparatus includes: a spindle control circuit for rotating the disk 7; a positioner control circuit for moving the entire optical head 50 with respect to the disk 7 and so on (not shown).

Described in this exemplary embodiment is a recording/reproducing device which performs recording and reproduction on the disk 7. Besides, possible exemplary embodiments of the optical information recording/reproducing apparatus of the present invention include a reproduction-dedicated device that performs only reproduction on the disk 7. In this case, the semiconductor laser 1 included within the optical head 50 is not driven by the semiconductor laser drive circuit 12 on the basis of the recording signal, but kept driven with a constant output.

Figure 1:
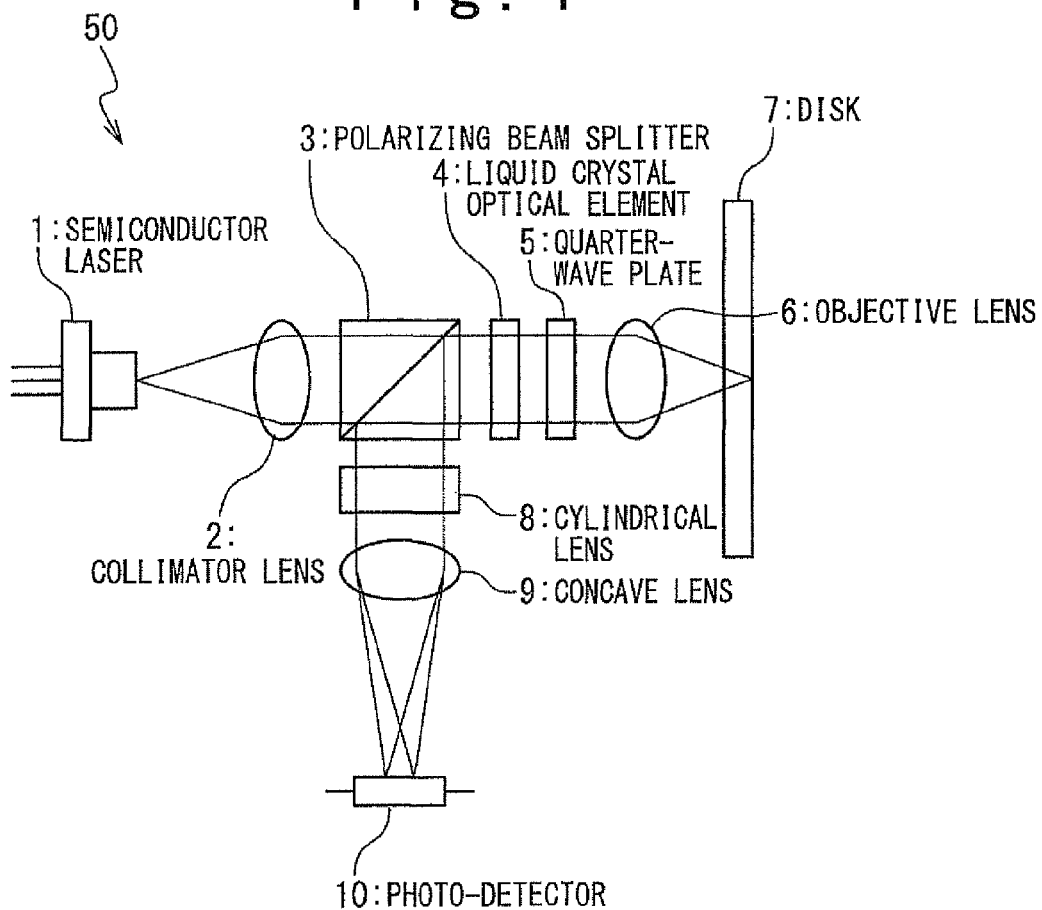
FIG. 1 is a diagram showing a configuration of an optical head of an optical information recording/reproducing apparatus in exemplary embodiments of the present invention.

FIG. 1 shows the configuration of the optical head 50 in the exemplary embodiments of the present invention. The optical head 50 includes: the semiconductor laser 1; a collimator lens 2; a polarizing beam splitter 3; the liquid crystal optical element 4; a quarter-wave plate 5; the objective lens 6; a cylindrical lens 8; a concave lens 9; and the photo-detector 10. Light emitted from the semiconductor laser 1 which is a light source is collimated by the collimator lens 2, and is made incident as the P-polarized light on the polarizing beam splitter 3 serving as the light splitting means. The polarizing beam splitter 3 transmits the incident light therethrough almost completely to output to the liquid crystal optical element 4.

The liquid crystal optical element 4, which is provided for the aberration correction of the transmitted light, transmits the incident light. The light transmitted through the liquid crystal optical element 4 is transmitted through the quarter-wave plate 5 and converted from linear polarized light into circular polarized light. The circular polarized light is focused onto the disk 7 serving as an optical recording medium by the objective lens 6.

The reflection light reflected by the disk 7 is transmitted backward through the objective lens 6, and then made incident on the quarter-wave plate 5. The quarter-wave plate 5 converts the transmitted light from the circular polarized light into linear polarized light whose polarization direction is orthogonal to that on the forward path, and outputs the linear polarized light. The light converted into linear polarized light is transmitted backward through the liquid crystal optical element 4, and made incident as S polarized light on the polarizing beam splitter 3. The light almost completely reflected by the polarizing beam splitter 3 toward the cylindrical lens 8 is transmitted through the cylindrical lens 8 and the concave lens 9, and then received by the photo-detector 10. The photo-detector 10 is positioned in the middle between two focal lines formed by the cylindrical lens 8 and the concave lens 9. The photo-detector 10 has light receiving parts quarterly divided by a parting line parallel to the radial direction of the disk 7 and a parting line parallel to the tangential direction thereof. On the basis of outputs from the respective light receiving part, a focus error signal is obtained by an astigmatism method, a truck error signal is obtained by a phase difference method or a push-pull method, and a reproduced signal is obtained.

Figure 4A:
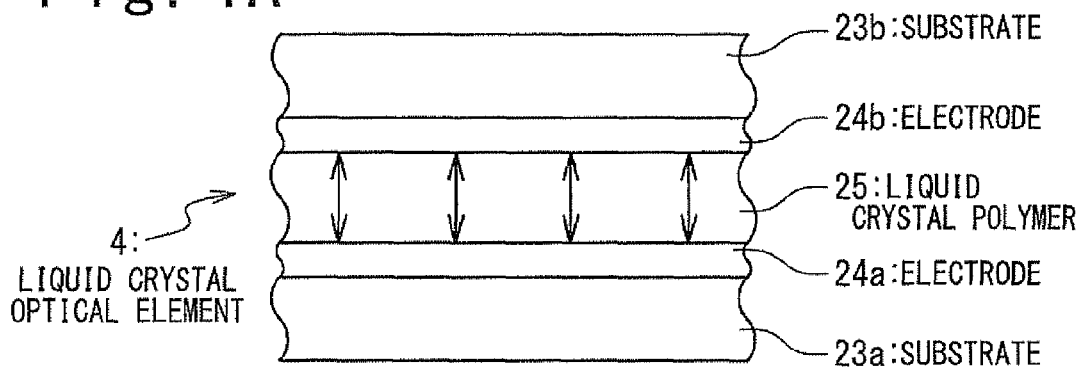
FIGS. 4A to 4C are sectional views of a liquid crystal optical element according to the exemplary embodiments of the present invention.
Figure 4B:
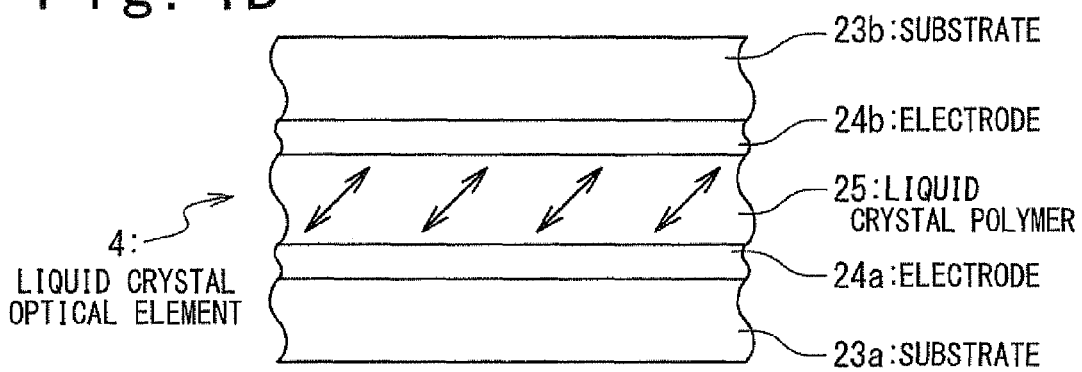
Figure 4C:
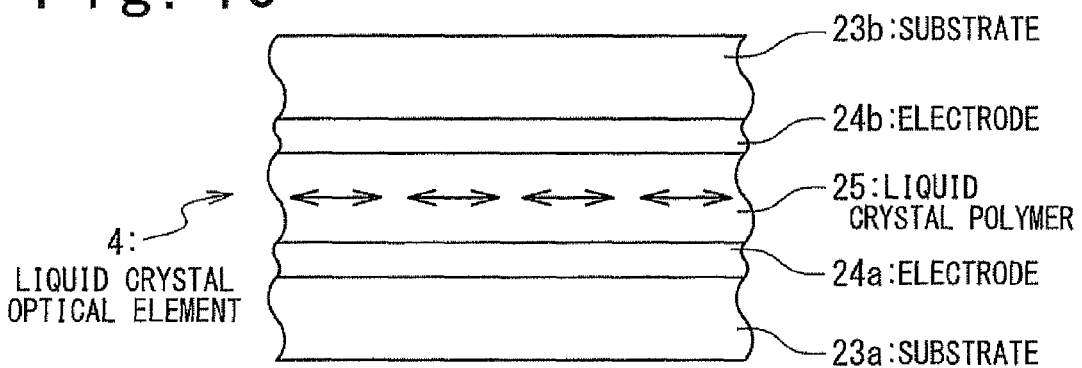

FIGS. 4A to 4C show sectional views of the liquid crystal optical element 4. The liquid crystal optical element 4 is structured to have liquid crystal polymer 25 sandwiched between two substrates 23a and 23b. An electrode 24a is formed on the surface of the substrate 23a on the side of the liquid crystal polymer 25, and an electrode 24b is formed on the surface of the substrate 23b on the side of the liquid crystal polymer 25. For the case that the liquid crystal optical element 4 provides astigmatism correction, the electrode 24a is a pattern electrode 18 having a pattern for correcting astigmatism, and the electrode 24b is an entire surface electrode. Arrows in the figures show the longitudinal direction of the liquid crystal polymer 25. The liquid crystal polymer 25 has uniaxial refractive index anisotropy such that the direction of the optical axis is in the longitudinal direction. Therefore, the refractive index for the light component polarized in the direction parallel to the longitudinal direction (abnormal light component) is larger than the reflective index for light component polarized in the direction vertical to the longitudinal direction (normal light component).

Light on the forward path within the optical head 50 is made incident on the liquid crystal optical element 4 as linear polarized light whose polarization direction is parallel to the plane of the figures. In FIG. 4A, the angle formed by the longitudinal direction of the liquid crystal polymer 25 and the polarization direction of the light incident on the liquid crystal optical element 4 is 90°. Therefore, the light incident on the liquid crystal optical element 4 has only a normal light component; thus, the refractive index for this light is a small refractive index for the normal light component. In FIG. 4B, the angle formed by the longitudinal direction of the liquid crystal polymer 25 and the polarization direction of the light incident on the liquid crystal optical element 4 is in the middle between 90° and 0°. Therefore, the light incident on the liquid crystal optical element 4 has both a normal light component and an abnormal light component; thus, the refractive index for this light is a refractive index in the middle between a small refractive index for the normal light component and a large refractive index for the abnormal light component. In FIG. 4C, the angle formed by the longitudinal direction of the liquid crystal polymer 25 and the polarization direction of the light incident on the liquid crystal optical element 4 is 0°. Therefore, the light incident on the liquid crystal optical element 4 has only an abnormal light component; thus, the refractive index for this light is a large refractive index for the abnormal light component.

Figure 5:
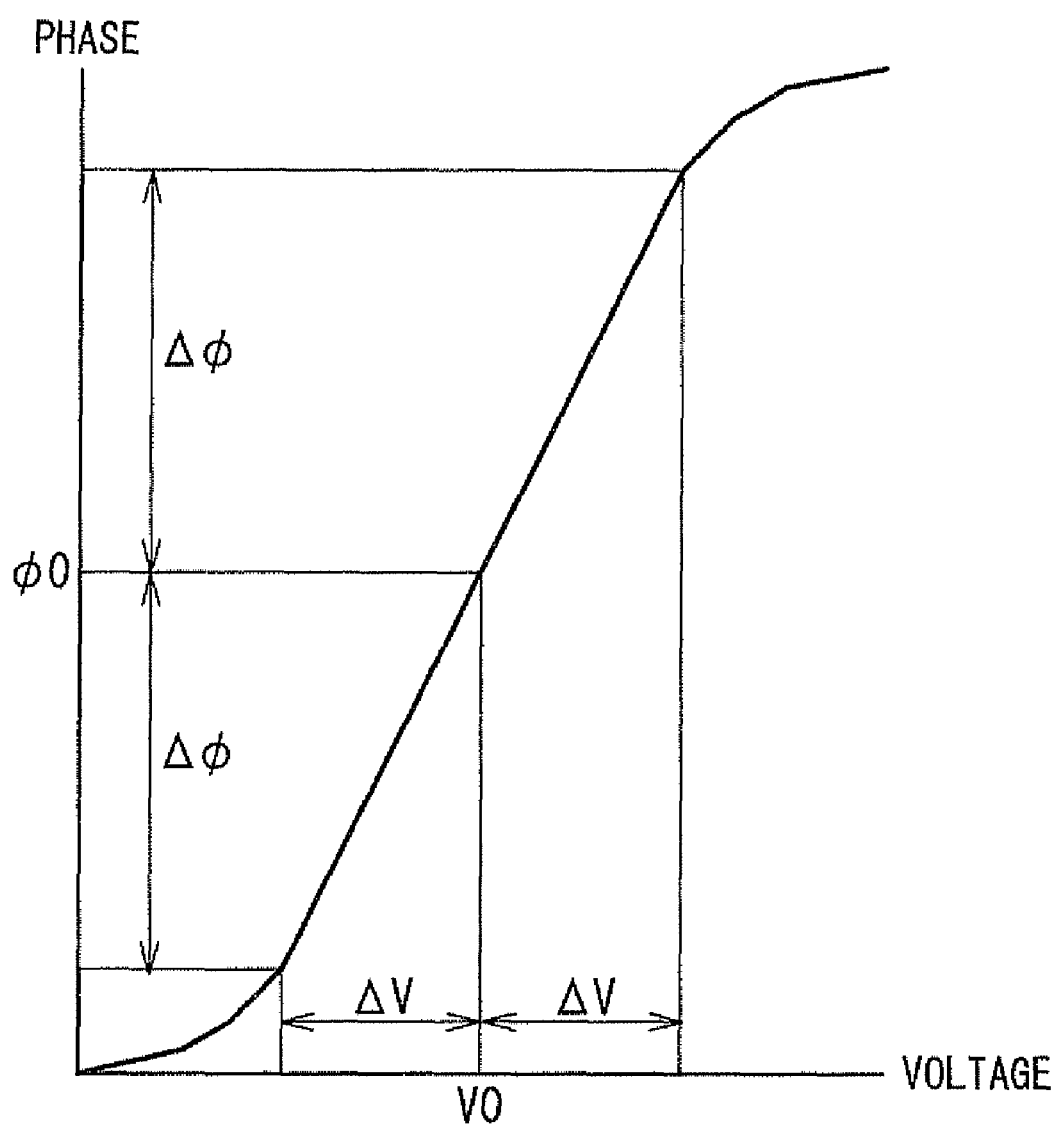
FIG. 5 is a diagram showing the relationship between the voltages applied to the electrode of the liquid crystal optical element and the phase of light transmitted through the liquid crystal optical element according to exemplary embodiments of the present invention.

FIG. 5 shows relationship between the voltage applied between the electrodes of the liquid crystal optical element 4 and the phase of light transmitted through the liquid crystal optical element 4. As the voltage applied between the electrodes 24a and 24b of the liquid crystal optical element 4 is increased, the angle formed by the longitudinal direction of the liquid crystal polymer 25 and the polarization direction of the light incident on the liquid crystal optical element 4 is increased from the state of FIG. 4C to the state of FIG. 4A. In this case, the refractive index for the light incident on the liquid crystal optical element 4 is reduced, and thus the phase of the light transmitted through the liquid crystal optical element 4 is advanced. As shown in FIG. 5, when the voltage applied between the electrodes 24a and 24b of the liquid crystal optical element 4 is within the range of V0±ΔV and the phase of the light transmitted through the liquid crystal optical element 4 is within the range of Φ0±ΔΦ, the relationship between the voltage applied between the electrodes 24a and 24b of the liquid crystal optical element 4 and the phase of the light transmitted through the liquid crystal optical element 4 is substantially linear. Usually, the voltage V0 is approximately 2.5 volts and the voltage ΔV is approximately 0.5 volts.

Next, a description is given of astigmatism. When X and Y axes are defined in the radial direction and tangential direction of an optical recording medium, respectively, wave aberration caused by astigmatism of arbitrary direction and magnitude can be expressed by a quadratic function of X and Y. A general form of the quadratic function of X and Y is given as $AX^2+2BXY+CY^2$ (where A, B, and C are constant numbers). Therefore, correction of the astigmatism of arbitrary direction and magnitude can be achieved if the wave aberration expressed by this formula can be corrected. This formula is modified into $(A+C)(X^2+Y^2)/2+(A-C)(X^2-Y^2)/2+2BXY$, where $(X^2+Y^2)$ denotes wave aberration caused by defocus aberration, $(X^2-Y^2)$ denotes wave aberration caused by astigmatism between the 0° direction and the 90° direction, and 2XY denotes wave aberration caused by astigmatism between the 45° direction and the 135° direction.

The defocus aberration is automatically corrected by focus servo, and therefor the correction of the astigmatism of arbitrary direction and magnitude is achieved if the astigmatism between the 0° direction and the 90° direction and the astigmatism between the 45° direction and the 135° direction are simultaneously corrected by the liquid crystal optical element. Notedly, $(A-C)/2$, which is the coefficient of $(X^2-Y^2)$ and B, which is the coefficient of 2XY, are independent from each other. Therefore, a change in the magnitude of one of the astigmatism between the 0° direction and the 90° direction and the astigmatism between the 45° direction and the 135° direction does not result in a change in the magnitude of the other astigmatism.

First Exemplary Embodiment

Figure 2:
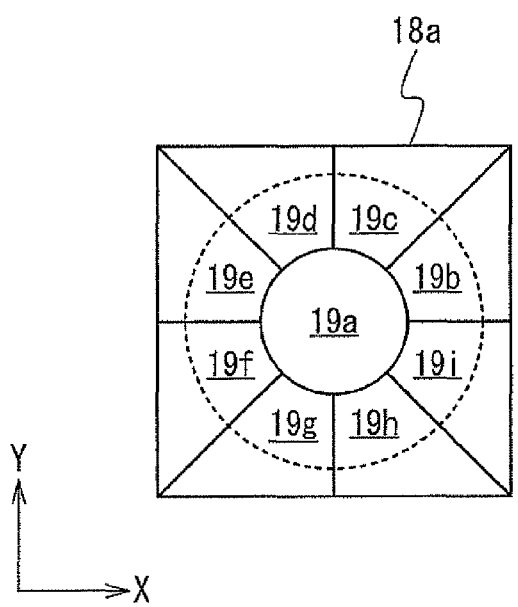
FIG. 2 is a plan view of a pattern electrode of a liquid crystal optical element for correcting astigmatism in a first exemplary embodiment of the present invention.

In a first exemplary embodiment of the present invention, the liquid crystal optical element 4 for correcting astigmatism is provided with: a pattern electrode 18a having a pattern for correcting astigmatism as the electrode 24a or 24b formed on the surface of one substrate on the liquid crystal polymer side; and an entire surface electrode formed on the surface of the other substrate on the liquid crystal polymer side. FIG. 2 is a plan view of the pattern electrode 18a of the liquid crystal optical element 4 for correcting astigmatism in the first exemplary embodiment. In the figure, X and Y axes respectively correspond to the radial and tangential directions of the disk 7. The pattern electrode 18a is, as shown in FIG. 2, divided into nine regions. Specifically, the pattern electrode 18a is divided into: a region 19a formed in the shape of circle with an optical axis serving as a center; and regions 19b to 19i which are positioned outside the region 19a and divided by four straight lines passing through the optical axis in units of 45 degrees in accordance with the angle around the optical axis. The dotted line in the figure indicates the effective diameter of the objective lens 6.

Figure 3A:
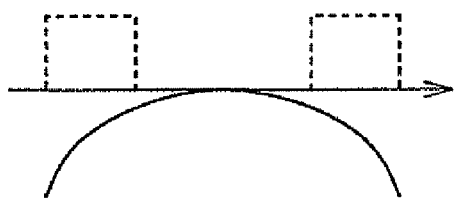
FIGS. 3A to 3D are diagrams showing wave aberration when astigmatism is corrected by liquid crystal optical elements according to first and second exemplary embodiments of the present invention.
Figure 3B:
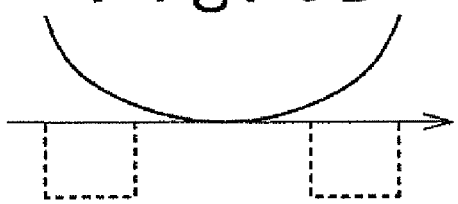
Figure 3C:
Figure 3D:

FIGS. 3A to 3D show wave aberration when astigmatism is corrected with the liquid crystal optical element 4. FIGS. 3A to 3D show the wave aberration on the cross section in the X-axis or Y-axis direction passing through the optical axis, describing the astigmatism between the 0° and 90° directions. FIGS. 3A to 3D also shows wave aberration on the cross section in the 45° direction with respect to the X-axis direction passing through the optical axis or in the 45° direction with respect to the Y-axis direction, for the astigmatism between the 45° direction and the 135° direction. Solid lines of FIGS. 3A and 3B show the wave aberration caused by astigmatism to be corrected. The liquid crystal optical element drive circuit 15 corrects the wave aberration caused by astigmatism by controlling voltages applied to the pattern electrode 18a of the liquid crystal optical element 4. Dotted lines of FIGS. 3A and 3B show the wave aberration caused by the liquid crystal optical element 4 that corrects the astigmatism. Solid lines of FIGS. 3C and 3D show remaining wave aberration when the astigmatism is corrected by the liquid crystal optical element 4.

When the coefficient of $X^2-Y^2$ which indicates the wave aberration caused by the astigmatism to be corrected, is negative, as shown by the solid line of FIG. 3A in which the horizontal axis is defined as the X-axis, the wave aberration on the cross section in the X-axis direction passing through the optical axis changes in the form of a quadratic function, i.e., to negative values, to 0, and to negative values, as it goes from the negative side to the positive side of the X-axis. Moreover, as shown by the solid line of FIG. 3B in which the horizontal axis is defined as the Y-axis, the wave aberration on the cross section in the Y-axis direction passing through the optical axis changes in the form of a quadratic function, i.e., to positive values, to 0, and to positive values, as it goes from the negative side to positive side of the Y-axis.

When the astigmatism is corrected by the liquid crystal optical element 4, as shown by the dotted line in FIG. 3A, the wave aberration caused by the liquid crystal optical element 4 on the cross section in the X-axis direction passing through the optical axis changes in a staircase pattern, i.e., to a positive value, to 0, and to the positive value as it goes from the negative side to positive side of the X-axis. Moreover, as shown by the dotted line in FIG. 3B, the wave aberration caused by the liquid crystal optical element 4 on the cross section in the Y-axis direction passing through the optical axis changes in a stair case pattern, i.e., to a negative value, to 0, and to the negative value from the negative side toward positive side of the Y-axis. When the amount of the astigmatism corrected by the liquid crystal optical element 4 is adjusted optimally, the RMS (root-mean-square) of the remaining wave aberration after the astigmatism correction is minimized. FIG. 3C shows the remaining wave aberration on the cross section in the X-axis direction passing through the optical axis in this condition, that is, the superposition of the wave aberration indicated by the solid line and the wave aberration indicated by the dotted line in FIG. 3A. As is understood from FIG. 3C, the absolute value of the remaining wave aberration on the cross section in the X-axis direction passing through the optical axis is reduced to around zero. Moreover, FIG. 3D shows the remaining wave aberration on the cross section in the Y-axis direction passing through the optical axis in this condition, that is, the superposition of the wave aberration indicated by the solid line and the wave aberration indicated by the dotted line in FIG. 3B. As is understood by FIG. 3D, the absolute value of the remaining wave aberration on the cross section in the Y-axis direction passing through the optical axis is reduced to around zero.

When the coefficient of $X^2-Y^2$, which indicates the wave aberration caused by the astigmatism to be corrected, is positive, as shown by the solid line of FIG. 3B in which the horizontal axis is defined as the X-axis, the wave aberration on the cross section in the X-axis direction passing through the optical axis changes in the form of a quadratic function, i.e., to positive values, to 0, and to positive values as it goes from the negative side toward positive side of the X-axis. Moreover, as shown by the solid line of FIG. 3A in which the horizontal axis is defined as the Y-axis, the wave aberration on the cross section in the Y-axis direction passing through the optical axis changes in the form of a quadratic function, i.e., to negative values, to 0, and to negative values as it goes from the negative side toward positive side of the Y-axis.

As shown by the dotted line in FIG. 3B, the wave aberration caused by the liquid crystal optical element 4 on the cross section in the X-axis direction passing through the optical axis changes in a stair case pattern, i.e., to a negative value, to 0, and to the negative value as it goes from the negative side toward positive side of the X-axis. Moreover, as shown by the dotted line in FIG. 3A, the wave aberration caused by the liquid crystal optical element 4 on the cross section in the Y-axis direction passing through the optical axis changes in a stair case pattern, i.e., to a positive value, to 0, and to the positive value as it goes from the negative side toward positive side of the Y-axis. When the amount of the astigmatism corrected by the liquid crystal optical element 4 is adjusted optimally, the RMS (root-mean-square) of the remaining wave aberration after the stigmatism correction is minimized. FIG. 3D shows the remaining wave aberration on the cross section in the X-axis direction passing through the optical axis in this condition, that is, the superposition of the wave aberration indicated by the solid line and the Wave aberration indicated by the dotted line in FIG. 3B. As is understood from FIG. 3D, the absolute value of the remaining wave aberration on the cross section in the X-axis direction passing through the optical axis is reduced to around zero. Moreover, FIG. 3C shows the remaining wave aberration on the cross section in the Y-axis direction passing through the optical axis in this condition, that is, a sum of the wave aberration indicated by the solid line and the wave aberration indicated by the dotted line in FIG. 3A. As is understood from FIG. 3A, the absolute value of the remaining wave aberration on the cross section in the Y-axis direction passing through the optical axis is reduced to around zero.

Next, a method of controlling the liquid crystal optical element 4, which includes the pattern electrode 18a to correct astigmatism, will be described. Here, an effective voltage applied to the entire surface electrode of the liquid crystal optical element 4 is defined as V4 (hereinafter, expressed simply as voltage). Moreover, out of the regions of the pattern electrode 18a of the liquid crystal optical element 4, at least one region, for example, the region 19a is defined as a reference region, and the voltage applied to the reference region is defined as V1. Note that V1+V4=V0. That is, the voltage V0 is applied between the entire surface electrode and the reference region of the pattern electrode 18a. Therefore, the phase of light transmitted through the liquid crystal optical element 4 in the reference region is Φ0. When a region other than the reference region of the pattern electrode 18a of the liquid crystal optical element 4 is fed with a voltage higher than V1 (that is, the absolute value thereof is higher), the phase of the light transmitted through the liquid crystal optical element 4 in this region is advanced with respect to Φ0. That is, the light transmitted through the liquid crystal optical element 4 in this region experience positive wave aberration with respect to the light transmitted through the liquid crystal optical element 4 in the reference region. On the other hand, when a region other than the reference region out of the pattern electrode 18a of the liquid crystal optical element 4 is fed with a voltage lower than V1 (the absolute value thereof is lower), the phase of the light transmitted through this region of the liquid crystal optical element 4 is delayed with respect to Φ0. That is, the light transmitted through this region of the liquid crystal optical element 4 experiences negative wave aberration with respect to the light transmitted through the reference region of the liquid crystal optical element 4.

Therefore, the correction of the astigmatism between the 0° direction and the 90° direction is achieved by driving the pattern electrode 18a of the liquid crystal optical element 4 in accordance with the following two drive patterns, with the region 19a defined as the reference region. The phase of transmission light transmitted through the regions 19b, 19e, 19f, and 19i (referred to as a region group 191) is advanced with respect to the phase of transmission light transmitted through the region 19a, and the phase of transmission light transmitted through the regions 19c, 19d, 19g, and 19h (referred to as a region group 192) is delayed with respect to the phase of the transmission light transmitted through the region 19a. Alternatively, (2) the phase of the transmission light transmitted through the region group 191 is delayed with respect to the phase of the transmission light transmitted through the region 19a, and the phase of the transmission light transmitted through the region group 192 is delayed with respect to the phase of the transmission light transmitted through the region 19a. That is, a voltage (V1+Vα) is applied to the region group 191 and a voltage (V1−Vα) is applied to the region group 2, while the voltage V1 is applied to the region 19a.

Similarly, the correction of the astigmatism between the 45° direction and the 135° direction is achieved by driving the pattern electrode 18a of the liquid crystal optical element 4 in accordance with the following two drive patterns with the region 19a defined as the reference region. The phase of transmission light transmitted through the regions 19b, 19c, 19f, and 19g (referred to as a region group 193) is advanced with respect to the phase of the transmission light transmitted through the region 19a, and the phase of transmission light transmitted through the regions 19d, 19e, 19h, and 19i (referred to as a region group 194) is delayed with respect to the phase of the transmission light transmitted through the region 19a. Alternatively, (2) the phase of the transmission light transmitted through the region group 193 is delayed with respect to the phase of the transmission light transmitted through the region 19a, and the phase of the transmission light transmitted through the region group 194 is delayed with respect to the phase of the transmission light transmitted through the region 19a. That is, a voltage (V1+Vβ) is applied to the region group 193 and a voltage (V1−Vβ) is applied to the region group 4, while the voltage V1 is applied to the region 19a.

FIG. 6 shows relationship between the respective regions of the pattern electrode 18a of the liquid crystal optical element 4 for correcting astigmatism and the respective voltages applied to the respective regions. The voltage applied to the entire surface electrode of the liquid crystal optical element 4 is defined as the voltage V4. Moreover, the region 19a, which is selected out of the regions of the pattern electrode 18a of the liquid crystal optical element 4, is defined as a reference region, and the voltage applied to the reference region 19a is defined as the voltage V1. Note that V1+V4=V0. The voltage applied to the regions 19b and 19f is V1+Vα+Vβ, the voltage applied to the regions 19c and 19g is V1−Vα+Vβ, the voltage applied to the regions 19d and 19h is V1−Vα−Vβ, and the voltage applied to the regions 19e and 19i is V1+Vα−Vβ.

Here, assuming that the voltage Vβ=0 for simplicity, for Vα>0, the light transmitted through the region group 191 of the liquid crystal optical element 4 is advanced in phase with respect to the light transmitted through the reference region 19a of the liquid crystal optical element 4, and the light transmitted through the region group 192 of the liquid crystal optical element 4 is delayed in phase. Moreover, for Vα<0, the light transmitted through the region group 191 of the liquid crystal optical element 4 is delayed in phase with respect to the light transmitted through the reference region 19a of the liquid crystal optical element 4, and the light transmitted through the liquid crystal optical element 4 in the region group 192 is advanced in phase. That is, the change in the voltage Vα causes a change in the correction amount of astigmatism between the 0° direction and the 90° direction. The signs of correctable astigmatism for Vα>0 and Vα<0 are opposite to each other. The absolute value of the amount of correctable astigmatism is increased with the increase in the absolute value of the voltage Vα.

Assuming that the voltage Vα=0, on the other hand, for Vβ>0, the light transmitted through the region group 193 of the liquid crystal optical element 4 is advanced in phase with respect to the light transmitted through the reference region 19a of the liquid crystal optical element 4, and the light transmitted through the region group 194 of the liquid crystal optical element 4 is delayed in phase. Moreover, for Vβ<0, the light transmitted through the region group 193 of the liquid crystal optical element 4 is delayed in phase with respect to the light transmitted through the reference region 19a of the liquid crystal optical element, and the light transmitted through the region group 194 of the liquid crystal optical element 4 is advanced in phase. That is, the change in the voltage Vβ causes the change in the correction amount of astigmatism between the 45° direction and the 135° direction. The signs of correctable astigmatism for Vβ>0 and Vβ<0 are opposite to each other. The absolute value of the amount of correctable astigmatism is increased with the increase in the absolute value of the voltage Vβ.

Although the above is described with an assumption that Vβ=0 or Vα=0 for simplicity, the voltage Vα and the voltage Vβ are actually changeable within a range in which the sum of the absolute values of the voltages Vα and Vβ does not exceed a voltage ΔV. That is, the voltage Vα and the voltage Vβ are set so that it holds $|V\alpha|+|V\beta| \leq \Delta V$.

Figure 7A:
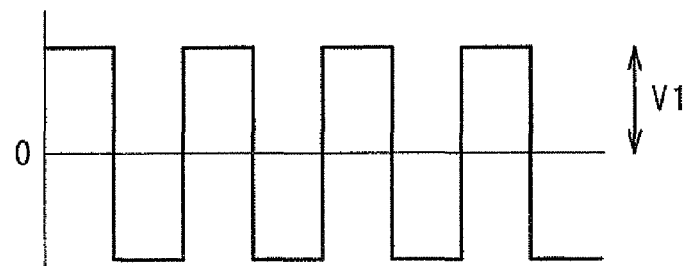
FIGS. 7A to 7E are diagrams showing waveforms of the voltages respectively applied to the regions of the pattern electrode of the liquid crystal optical element for correcting astigmatism in the first exemplary embodiment of the present invention.
Figure 7B:
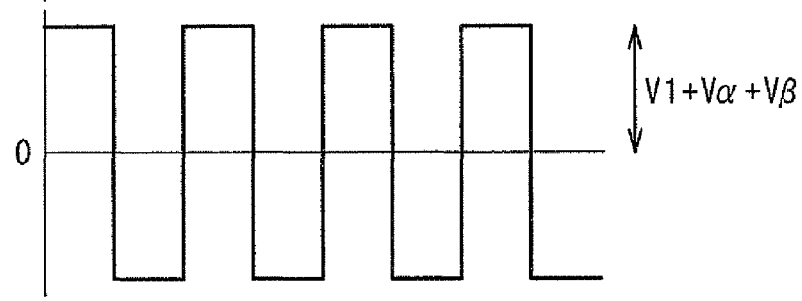
Figure 7C:
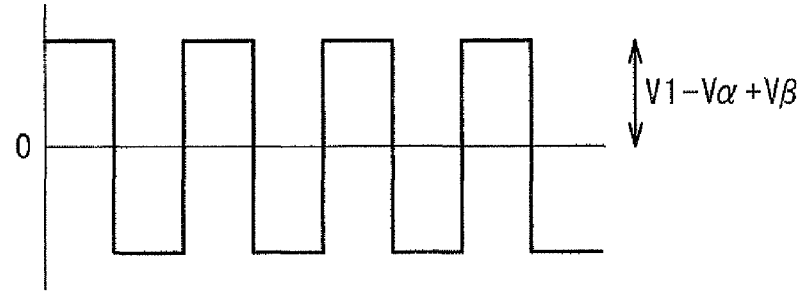
Figure 7D:
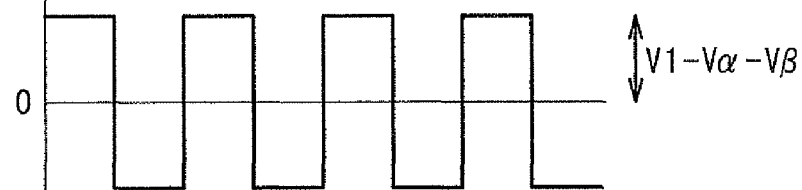
Figure 7E:
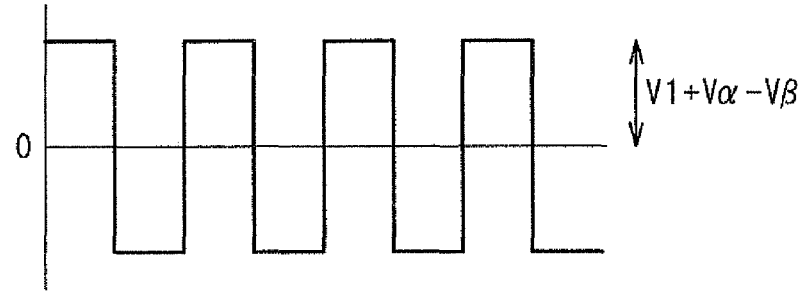

FIGS. 7A to 7E show waveforms of the voltages applied to the respective regions of the pattern electrode 18a of the liquid crystal optical element 4 for correcting astigmatism. In FIGS. 7A to 7E, the horizontal axis denotes the time, and the vertical axis denotes the voltage. Long-term application of a dc voltage to the electrode of the liquid crystal optical element causes destruction of the liquid crystal polymer. Thus, in practice, an alternating voltage is applied. As shown in FIGS. 7A to 7E, in-phase rectangular wave voltages of a frequency of approximately one kilohertz are applied to the respective regions of the pattern electrode 18a. As shown in FIG. 7A, the region 19a of the pattern electrode 18a of the liquid crystal optical element 4 is applied with a rectangular wave voltage with an amplitude of ±V1, and the effective voltage thereof is V1. As shown in FIG. 7B, the region 19b and the region 19f is applied with a rectangular wave voltage with an amplitude of ±(V1+Vα+Vβ), and the effective voltage thereof is (V1+Vα+Vβ). As shown in FIG. 7C, the region 19c and the region 19g is applied with a rectangular wave voltage with an amplitude of ±(V1−Vα+Vβ), and the effective voltage thereof is (V1−Vα+V). As shown in FIG. 7D, the region 19d and the region 19h is applied with a rectangular wave with an amplitude of ±(V1−Vα−Vβ), and the effective voltage thereof is (V1−Vα−Vβ). As shown in FIG. 7E, the region 19e and the region 19i is applied with a rectangular wave voltage with an amplitude of ±(V1+Vα−Vβ), and the effective voltage thereof is (V1+Vα−Vβ).

Figure 8:
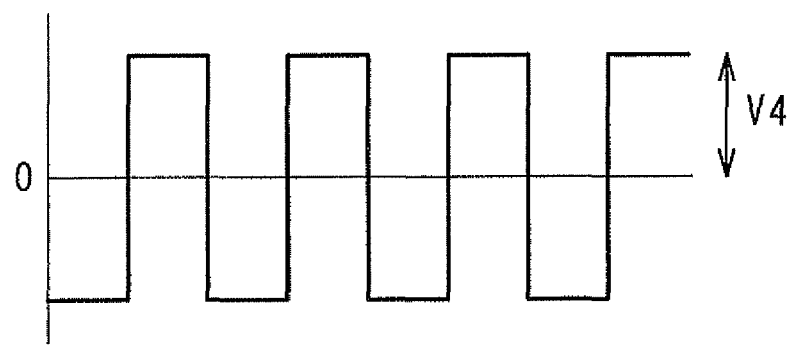
FIG. 8 is a diagram showing a waveform of a voltage applied to an entire surface electrode of the liquid crystal optical element for correcting astigmatism in first to fourth exemplary embodiments of the present invention.

FIG. 8 shows a waveform of the voltage applied to the entire surface electrode of the liquid crystal optical element 4 for correcting astigmatism. In FIG. 8, the horizontal axis denotes the time, and the vertical axis denotes the voltage. As shown in FIG. 8, the entire surface electrode of the liquid crystal optical element 4 is applied with a rectangular wave voltage having a frequency of approximately 1 kHz with an amplitude of ±V4, and the effective voltage thereof is V4. The waveform of the voltage applied to the entire surface electrode is opposite in phase to the waveforms of the voltages applied to the regions 19a to 19i of the pattern electrode 18a of the liquid crystal optical element 4. Therefore, an effective voltage of V0±Vα±Vβ is applied between the entire surface electrode and the pattern electrode 18a, and the phase varies with respect to Φ0 as center.

As described above, a change in the voltage Vα causes a change in the correction amount of astigmatism between the 0° and 90° directions, while a change in the voltage Vβ causes a change in the correction amount of astigmatism between the 45° and 135° directions. Therefore, determining the voltage Vα with the voltage Vβ fixed so that the quality evaluation index of the reproduced signal is best improved allows obtaining the optimum correction amount such that remaining wave aberration caused by the astigmatism between the 0° and 90° directions is minimized. Moreover, determining the voltage Vβ with the voltage Vα fixed so that the quality evaluation index of the reproduced signal is best improved allows obtaining an optimum correction amount such that remaining wave aberration caused by the astigmatism between the 45° and 135° directions is minimized.

A change in the amount of one of the astigmatism between the 0° and 90° directions and the astigmatism between the 45° and 135° directions does not result in a change in the amount of the other. Therefore, the voltage Vα such that the quality evaluation index of the reproduced signal is best improved (optimum voltage Vα0) does not depend on the voltage Vβ, and the voltage Vβ such that the quality evaluation index of the reproduced signal is best improved (optimum voltage Vβ0) does not depend on the voltage Vα. Therefore, whichever of the step for determining the optimum voltage Vα0 with the Vβ fixed and the step for determining the optimum voltage Vβ0 with the Vα fixed is carried out first, the same combination of the determined optimum voltages Vα0 and Vβ0 is obtained.

After the determination of the optimum voltages Vα0 and Vβ0, the aforementioned drive voltages are applied to the respective regions of the pattern electrode of the liquid crystal optical element on the basis of the combination determined. This allows simultaneously minimizing the remaining wave aberration caused by the astigmatism between the 0° and 90° directions and the remaining wave aberration caused by the astigmatism between the 45° and 135° directions. That is, astigmatism of the arbitrary direction and amount can be corrected. At this case, the quality of the reproduced signal from the optical recording medium is best improved. Moreover, in determining the combination of the optimum voltages Vα0 and Vβ0, the quality evaluation index of the reproduced signal is not measured for all combinations of the voltages Vα and Vβ; the quality evaluation index of the reproduced signal is only measured for all the voltages Vα with the voltage Vβ fixed and for all the voltages Vβ with the voltage Vα fixed. Thus, the combination of the optimum voltages Vα0 and Vβ0 is determined in a short time.

Second Exemplary Embodiment

Figure 9:
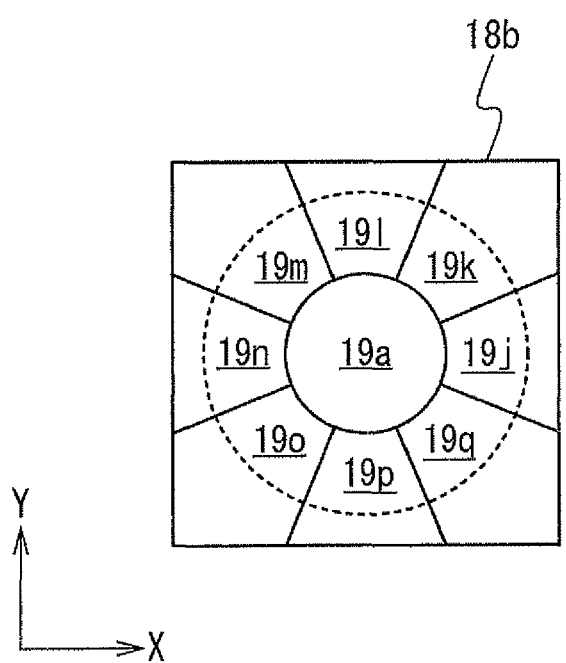
FIG. 9 is a plan view of a pattern electrode of the liquid crystal optical element for correcting astigmatism in the second exemplary embodiment of the present invention.

In a second exemplary embodiment of the present invention, the liquid crystal optical element 4 for correcting astigmatism is structured to have a liquid crystal polymer sandwiched between two substrates. A pattern electrode 18b having a pattern for correcting astigmatism is formed on the surface of one of the substrates on the liquid crystal polymer side, and an entire surface electrode is formed on the surface of the other substrate on the liquid crystal polymer side. FIG. 9 is a plan view of the pattern electrode 1b of the liquid crystal optical element 4 for correcting astigmatism in the second exemplary embodiment. In the figure, X and Y axes respectively correspond to the radial and tangential directions of the disk 7. As shown in FIG. 9, the pattern electrode 18b is divided into nine regions. Specifically, the pattern electrode 18b is divided into: a region 19a formed in the circular shape with the optical axis as center; and regions 19j to 19q which are positioned outside the region 19a and divided by four straight lines passing through the optical axis in units of 45 degrees in accordance with the angle around the optical axis. The dotted line in the figure corresponds to the effective diameter of the objective lens 6.

Wave aberration when astigmatism is corrected by the liquid crystal optical element 4 in the second exemplary embodiment is same as that shown in FIGS. 3A to 3D. Moreover, sectional views of the liquid crystal optical element 4 in the second exemplary embodiment are the same as those shown in FIG. 4. Further, the relationship between voltages applied to the electrode of the liquid crystal optical element 4 and the phase of light transmitted through the liquid crystal optical element 4 in the second exemplary embodiment is same as that shown in FIG. 5.

FIG. 10 shows relationship between the regions of the pattern electrode 18b of the liquid crystal optical element 4 for correcting astigmatism and the voltages applied to the respective regions in the second exemplary embodiment. Here, the voltage applied to the entire surface electrode of the liquid crystal optical element 4 is defined as the voltage V4. Moreover, out of the regions of the pattern electrode 18b of the liquid crystal optical element 4, the region 19a is defined as a reference region, and the voltage applied to the reference region is defined as the voltage V1. Note that V1+V4=V0. That is, the voltage V0 is applied between the entire surface electrode and the reference region 19a of the pattern electrode 18b. Therefore, the phase of light transmitted through the reference region 19a of the liquid crystal optical element 4 is Φ0. The voltage applied to the regions 19j and 19n is V1+Vα, the voltage applied to the regions 19k and 19o is V1+Vβ, the voltage applied to the regions 19l and 19p is V1−Vα, and the voltage applied to the regions 19m and 19q is V1−Vβ.

Here, assuming that the voltage Vβ=0 for simplicity, for Vα>0, light transmitted through the regions 19j and 19n of the liquid crystal optical element 4 is advanced in phase with respect to the light transmitted through the reference region 19a of the liquid crystal optical element 4, and light transmitted through the regions 19l and 19p of the liquid crystal optical element 4 is delayed in phase, and the phase of light transmitted through the regions 19k, 19m, 19o, and 19q of the liquid crystal optical element 4 is same. Moreover, for Vα<0, the light transmitted through the regions 19j and 19n of the liquid crystal optical element 4 is delayed in phase with respect to the light transmitted through the reference region 19a of the liquid crystal optical element 4, and the light transmitted through the regions 19l and 19p of the liquid crystal optical element 4 is advanced in phase, and the light transmitted through the regions 19k, 19m, 19o, and 19q of the liquid crystal optical element 4 is equal in phase. Therefore, a change in the voltage Vα causes a change in the correction amount of astigmatism between the 0° and 90° directions. The signs of correctable astigmatism for Vα>0 and Vα<0 are opposite to each other. The absolute value of the amount of correctable astigmatism is increased with an increase in the absolute value of the voltage Vα.

Assuming that the voltage Vα=0, on the other hand, for Vβ>0, light transmitted through the regions 19k and 19o of the liquid crystal optical element 4 is advanced in phase with respect to the light transmitted through the reference region 19a of the liquid crystal optical element 4, light transmitted through the regions 19m and 19q of the liquid crystal optical element 4 is delayed in phase, and light transmitted through the regions 19j, 19l, 19n, and 19p of the liquid crystal optical element 4 is equal in phase. Moreover, for Vβ<0, the light transmitted through the regions 19k and 19o of the liquid crystal optical element 4 is delayed in phase with respect to the light transmitted through the reference region 19a of the liquid crystal optical element 4, the light transmitted through the regions 19m and 19q of the liquid crystal optical element 4 is advanced in phase, and light transmitted through the regions 19j, 19l, 19n, and 19p of the liquid crystal optical element 4 is equal in phase. That is, a change in the voltage Vβ causes a change in the correction amount of astigmatism between the 450 and 1350 directions. The signs of correctable astigmatism for Vβ>0 and Vβ<0 are opposite to each other. The absolute value of the amount of correctable astigmatism is increased with the increase in the absolute value of the voltage Vβ.

Although the above is described with an assumption that Vβ=0 or Vα=0 for simplicity, the voltages Vα and Vβ may be actually changed within a range such that the sum of the absolute values of the voltages Vα and Vβ does not exceed the voltage ΔV. That is, the voltage Vα and the voltage Vβ are set so that it holds |Vα|+|Vβ|≦ΔV.

Figure 11A:
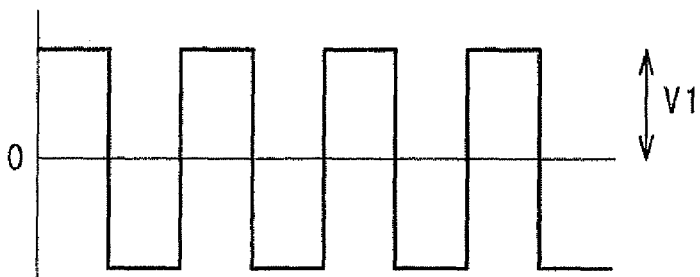
FIGS. 11A to 11E are diagrams showing waveforms of the voltages applied to the respective regions of the pattern electrode of the liquid crystal optical element for correcting astigmatism in the second exemplary embodiment of the present invention.
Figure 11B:
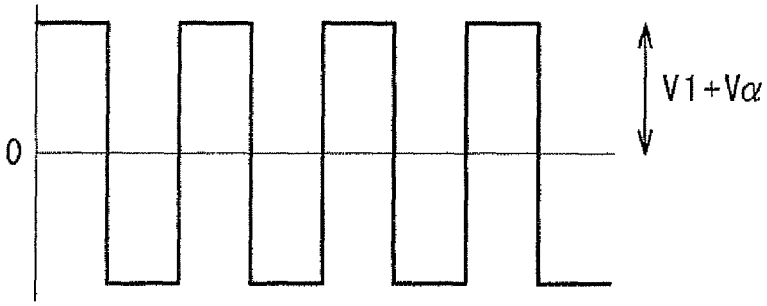
Figure 11C:
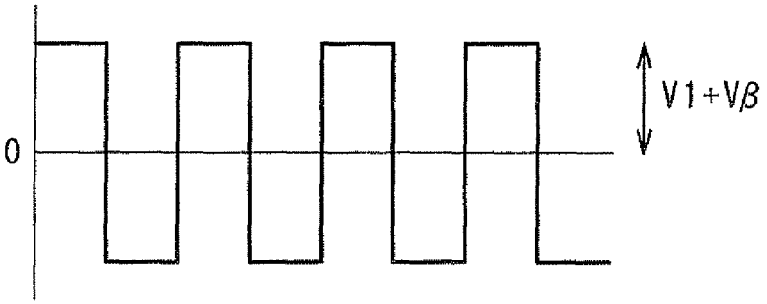
Figure 11D:
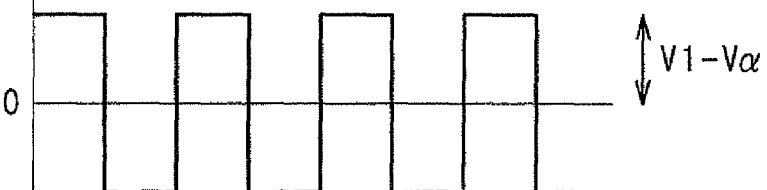
Figure 11E:
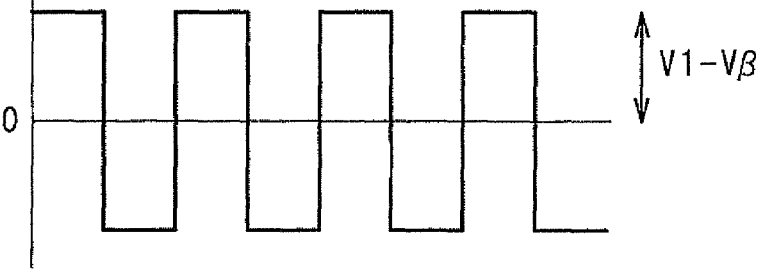

FIGS. 11A to 11E show waveforms of the voltages applied to the respective regions of the pattern electrode 18b of the liquid crystal optical element 4 for correcting astigmatism in the second exemplary embodiment. In FIGS. 11A to 11E, the horizontal axis denotes the time, and the vertical axis denotes the voltage. Long-term application of a dc voltage to the electrode of the liquid crystal optical element causes destruction of the liquid crystal polymer. Therefore, an ac voltage is actually applied. As shown in FIGS. 11A to 11E, in-phase rectangular wave voltages having a frequency of approximately one kilohertz are applied to the respective regions of the pattern electrode 18b. As shown in FIG. 11A, the region 19a of the pattern electrode 18b of the liquid crystal optical element 4 is applied with a rectangular wave voltage with an amplitude of ±V1, and the effective voltage thereof is V1. As shown in FIG. 11B, the regions 19j and 19n are applied with a rectangular wave voltage with an amplitude of ±(V1+Vα) and the effective voltage thereof is (V1+Vα). As shown in FIG. 11C, the regions 19k and 19o are applied with a rectangular wave voltage with an amplitude of ±(V1+Vβ), and the effective voltage thereof is (V1+Vβ). As shown in FIG. 11D, the regions 19l and 19p are applied with a rectangular wave voltage with an amplitude of ±(V1−Vα), and the effective voltage thereof is (V1−Vα). As shown in FIG. 11E, the regions 19m and 19q are applied with a rectangular wave voltage with an amplitude of ±(V1−Vβ), and the effective voltage thereof is (V1−Vβ). The waveform of the voltage applied to the entire surface electrode of the liquid crystal optical element 4 is same as that shown in FIG. 8.

Third Exemplary Embodiment

Figure 12:
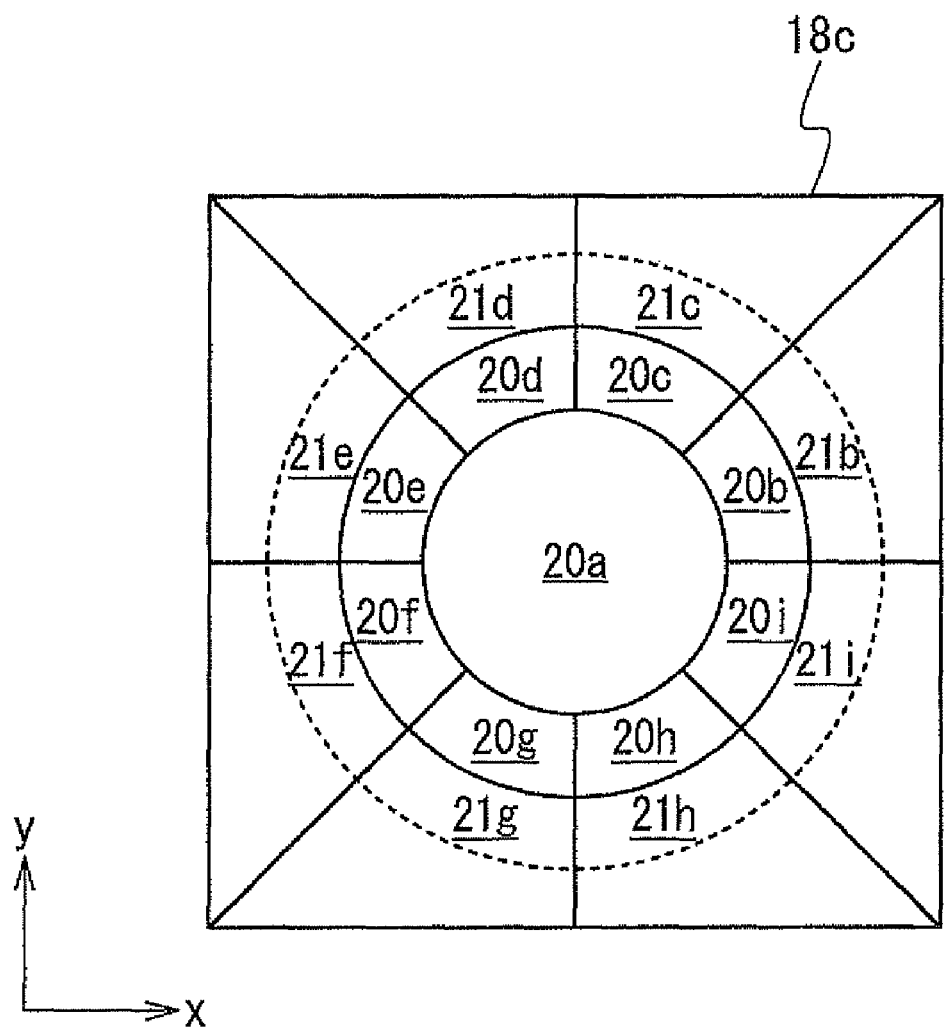
FIG. 12 is a plan view of a pattern electrode of the liquid crystal optical element for correcting astigmatism in the third exemplary embodiment of the present invention.

In a third exemplary embodiment of the present invention, the liquid crystal optical element 4 for correcting astigmatism is structured to have a liquid crystal polymer sandwiched between two substrates. On the surface of one of the substrates on the liquid crystal polymer side, a pattern electrode 18c having a pattern for correcting astigmatism is formed, and on the surface of the other substrate on the liquid crystal polymer side, an entire surface electrode is formed. FIG. 12 is a plan view of the pattern electrode 18c of the liquid crystal optical element 4 for correcting astigmatism in the third exemplary embodiment. In the figure, X and Y axes respectively correspond to the radial and tangential directions of the disk 7. The pattern electrode 18c is, as shown in FIG. 12, divided into 17 regions. Specifically, the pattern electrode 18c is divided into: a circular region 20a with the optical axis as center; regions 20b to 20i which are positioned outside the region 20a and divided by four straight lines passing through the optical axis in units of 45 degrees in accordance with the angle around the optical axis; and regions 21b to 21i positioned outside the regions 20b to 20i and divided by the four straight lines passing through the optical axis in units of 45 degrees in accordance with the angle around the optical axis. The boundary between the regions 20b to 20i and the regions 21b to 21i is a circle with the optical axis as center. A dotted line in the figure corresponds to the effective diameter of the objective lens 6.

A description will be given of wave aberration for the case that astigmatism is corrected by the liquid crystal optical element 4. When the wave aberration caused by astigmatism to be corrected varies in the form of a quadratic function, i.e., to negative values, to zero, and to negative values as it goes from the negative side to positive side of the horizontal axis, as shown by the solid line of FIG. 3A, the liquid crystal optical element drive circuit 15 controls the voltages applied to the pattern electrode 18c of the liquid crystal optical element 4 to thereby generate wave aberration for correction. Specifically, when the correction is achieved by the liquid crystal optical element 4, the wave aberration caused by the liquid crystal optical element 4 varies in a stair case pattern, i.e., to a second positive value, to a first positive value, to 0, to the first positive value, and to the second positive value as is goes from the negative side to the positive side of the horizontal axis. The second positive value is K times the first positive value, where K is a constant number larger than 1. Moreover, when the wave aberration caused by astigmatism to be corrected varies in the form of a quadratic function, i.e., to positive values, to 0, and to positive values as it goes from the negative side to positive side of the horizontal axis, as shown by a solid line of FIG. 3B, the liquid crystal optical element drive circuit 15 controls the voltages applied to the pattern electrode 18c of the liquid crystal optical element 4 to thereby generate wave aberration for correction. The wave aberration caused by the liquid crystal optical element 4 changes in a stair case pattern, i.e., to a second negative value, to a first negative value, to 0, to the first negative value, and to the second negative value as it goes from the negative side to the positive side of the horizontal axis. The second negative value is K times the first positive value, where K is a constant number larger than 1. Optimally defining the amount of the astigmatism corrected by the liquid crystal optical element 4 allows minimizing the RMS of the remaining wave aberration after the astigmatism correction. In the third exemplary embodiment, the RMS of the remaining wave aberration is made smaller, compared to the first exemplary embodiment. The value of K is preferably approximately 2 to 4 to make the RMS of the remaining wave aberration as small as possible.

Sectional views of the liquid crystal optical element 4 in this third exemplary embodiment are same as those shown in FIGS. 4A to 4C. Moreover, the relationship between the voltages applied to the electrode of the liquid crystal optical element 4 and the phase of light transmitted through the liquid crystal optical element 4 is same as those shown in FIG. 5.

FIG. 13 shows relationship between the regions of the pattern electrode 18c of the liquid crystal optical element 4 for correcting astigmatism and the voltages applied to the respective regions in the third exemplary embodiment. Here, the voltage applied to the entire surface electrode of the liquid crystal optical element 4 is defined as the voltage V4. Moreover, out of the regions of the pattern electrode 18c of the liquid crystal optical element 4, the region 20a is defined as a reference region, and the voltage applied to the reference region is defined as the voltage V1. Note that V1+V4=V0. That is, the voltage V0 is applied between the entire surface electrode and the reference region 20a of the pattern electrode 18c. Therefore, the phase of light transmitted through the reference region 20a of the liquid crystal optical element 4 is Φ0. As shown in FIG. 13, the voltage applied to the regions 20b and 20f is V1+Vα+Vβ, the voltage applied to the regions 20c and 20g is V1−Vα+Vβ, the voltage applied to the regions 20d and 20h is V1−Vα−Vβ, and the voltage applied to the regions 20e and 20i is V1+Vα−Vβ. Further, the voltage applied to the regions 21b and 21f is V1+K·Vα+K·Vβ, the voltage applied to the regions 21c and 21g is V1−K·Vα+K·Vβ, the voltage applied to the regions 21d and 21h is V1−K·Vα−K·Vβ, and the voltage applied to the regions 21e and 21i is V1+K·Vα−K·Vβ.

Here, assuming that the voltage Vβ=0 for simplicity, for Vα>0, light transmitted through the regions 20b, 20e, 20f, and 20i of the liquid crystal optical element 4 (hereinafter, referred to as the region group 201) is advanced in phase with respect to the light transmitted through the reference region 20a of the liquid crystal optical element 4, light transmitted through the regions 21b, 21e, 21f and 21i of the liquid crystal optical element 4 (hereinafter referred to as the region group 211) is further advanced in phase, light transmitted through the regions 20c, 20d, 20g, and 20h of the liquid crystal optical element 4 (hereinafter referred to as the region group 202) is delayed in phase, and light transmitted through the regions 21c, 21d, 21g, and 21h of the liquid crystal optical element 4 (hereinafter referred to as the region group 212) is further delayed in phase. Moreover, for Vα<0, light transmitted through the region group 201 of the liquid crystal optical element 4 is delayed in phase with respect to the light transmitted through the reference region 20a of liquid crystal optical element 4, light transmitted through the region group 211 of the liquid crystal optical element 4 is further delayed in phase, light transmitted through the region group 202 of the liquid crystal optical element 4 is advanced in phase, and light transmitted through the region group 212 of the liquid crystal optical element 4 is further advanced in phase. Therefore, a change in the value of the voltage Vα causes a change in the correction amount of astigmatism between the 0 and 90° directions. The signs of correctable astigmatism for Vα>0 and Vα<0 are opposite to each other. The absolute value of the amount of correctable astigmatism is increased with the increase in the absolute value of the voltage Vα.

Assuming that the voltage Vα=0, on the other hand, for Vβ>0, light transmitted through the regions 20b, 20c, 20f, and 20g of the liquid crystal optical element 4 (hereinafter referred to as the region group 203) is advanced in phase with respect to the light transmitted through the reference region 20a of the liquid crystal optical element 4, light transmitted through the regions 21b, 21c, 21f, and 21g of the liquid crystal optical element 4 (hereinafter referred to as the region group 213) is further advanced in phase, light transmitted through the regions 20d, 20e, 20h, and 20i of the liquid crystal optical element 4 (hereinafter referred to as a region group 204) is delayed in phase, and light transmitted through the regions 21d, 21e, 21h, and 21i of the liquid crystal optical element 4 (hereinafter referred to as a region group 214) is further delayed in phase. Moreover, for Vβ<0, light transmitted through the region group 203 of the liquid crystal optical element 4 is delayed in phase with respect to the light transmitted through the reference region 20a of the liquid crystal optical element 4, light transmitted through the region group 213 of the liquid crystal optical element 4 is further delayed in phase, light transmitted through the region group 204 of the liquid crystal optical element 4 is advanced in phase, and light transmitted through the region group 214 of the liquid crystal optical element 4 is further advanced in phase. Therefore, a change in the value of the voltage Vβ causes a change in the correction amount of astigmatism between the 45° and 135° directions. The signs of correctable astigmatism for Vβ>0 and Vβ<0 are opposite to each other. The absolute value of the amount of correctable astigmatism is increased with the increase in the absolute value of Vβ.

Although the above is described with an assumption that Vβ=0 or Vα=0 for simplicity, the voltages Vα and Vβ may be actually changed within a range in which K times the sum of the absolute values of the voltages Vα and Vβ does not exceed the voltage ΔV. That is, the voltages Vα and Vβ are set so that it holds |K·Vα|+|K·Vβ|≦ΔV.

A description will be given of waveforms of the voltages applied to the respective regions of the pattern electrode 18c of the liquid crystal optical element 4 for correcting astigmatism in the third exemplary embodiment. Similarly the waveforms shown in FIGS. 7A to 7E and FIGS. 11A to 11E, in-phase rectangular wave voltages having a frequency of approximately one kilohertz are applied to the respective regions. The region 20a of the pattern electrode 18c of the liquid crystal optical element 4 is applied with the rectangular wave voltage with an amplitude of ±V1, and the effective voltage thereof is V1. The regions 20b and 20f are applied with a rectangular wave voltage with an amplitude of ±(V1+Vα+Vβ), and the effective voltage thereof is (V1+Vα+Vβ). The regions 20c and 20g are applied with a rectangular wave voltage with an amplitude of (V1−Vα+Vβ), and the effective voltage thereof is (V1−Vα+Vβ). The regions 20d and 20h are applied with a rectangular wave voltage with an amplitude of ±(V1−Vα−Vβ), and the effective voltage thereof is (V1−Vα−

Vβ). The regions 20e and 20i are applied with a rectangular wave voltage with an amplitude of (V1+Vα−Vβ), and the effective voltage thereof is (V1+Vα−Vβ). The regions 21b and 21f are applied with a rectangular wave voltage with an amplitude of ±(V1+K·Vα+K·Vβ), and the effective voltage thereof is (V1+K·Kα+K·Vβ). The regions 21c and 21g are applied with a rectangular wave voltage with an amplitude of ±(V1−K·Vα+K·Vβ), and the effective voltage thereof is (V1−K·Vα+K·Vβ). The regions 21d and 21h are applied with a rectangular wave voltage with an amplitude of ±(V1−K·Vα−K·Vβ), and the effective voltage thereof is (V1−K·Vα−K·Vβ). The regions 21e and 21i are applied with a rectangular wave voltage with an amplitude of ±(V1+K·Vα−K·Vβ), and the effective voltage thereof is (V1+K·Vα−K·Vβ). The waveform of the voltage applied to the entire surface electrode of the liquid crystal optical element 4 for correcting astigmatism is same as that shown in FIG. 8.

Fourth Exemplary Embodiment

Figure 14:
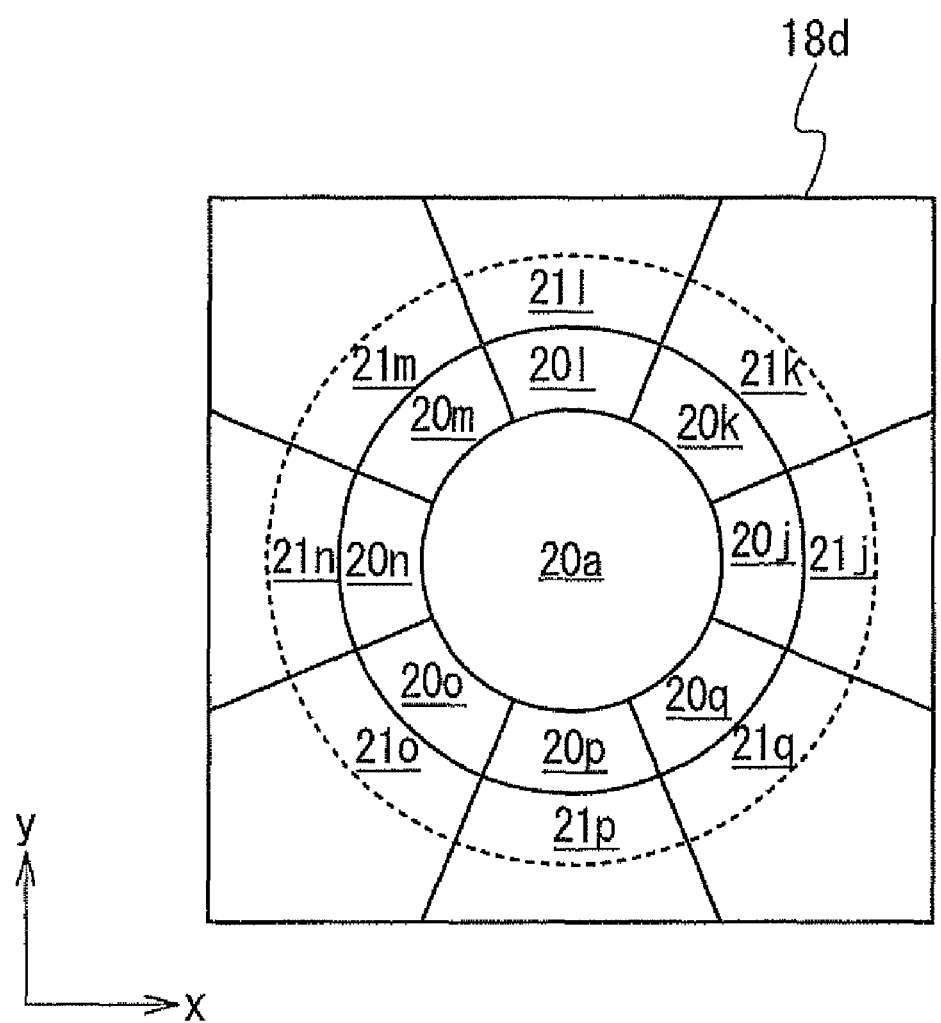
FIG. 14 is a plan view of a pattern electrode of the liquid crystal optical element for correcting astigmatism in the fourth exemplary embodiment of the present invention.

In a fourth exemplary embodiment of the present invention, the liquid crystal optical element 4 for correcting astigmatism is structured to have a liquid crystal polymer sandwiched between two substrates. On the surface of one of the substrates on the liquid crystal polymer side, a pattern electrode 18d having a pattern for correcting astigmatism is formed, and on the surface of the other substrate on the liquid crystal polymer side, an entire surface electrode is formed. FIG. 14 is a plan view of the pattern electrode 18d of the liquid crystal optical element 4 for correcting astigmatism in the fourth exemplary embodiment. In the figure, X and Y axes respectively correspond to the radial and tangential directions of the disk 7. The pattern electrode 18d is, as shown in FIG. 14, divided into 17 regions. Specifically, the pattern electrode 18d is divided into: a circular region 20a with the optical axis as center; regions 20j to 20q which are positioned outside the region 20a and divided by four straight lines passing through the optical axis in units of 45 degrees in accordance with the angle around the optical axis; and regions 21j to 21q which are positioned outside the regions 20j to 20q and divided by the four straight lines passing through the optical axis in units of 45 degrees in accordance with the angle around the optical axis. The boundary between the regions 20j to 20q and the regions 21j to 21q is a circle with the optical axis as center. The dotted line in the figure corresponds to the effective diameter of the objective lens 6.

Wave aberration when astigmatism is corrected by the liquid crystal optical element 4 in the fourth exemplary embodiment is same as that shown in the third exemplary embodiment. Therefore, in the fourth exemplary embodiment, as compared to the second exemplary embodiment described, the RMS of the remaining wave aberration can be made smaller. To make the RMS of the remaining wave aberration as small as possible, the value of K is preferably approximately 2 to 4.

Sectional views of the liquid crystal optical element 4 in this fourth exemplary embodiment are same as those shown in FIGS. 4A to 4C. Moreover, the relationship between the voltages applied to the electrode of the liquid crystal optical element 4 and the phase of light transmitted through the liquid crystal optical element 4 are same as those shown in FIG. 5.

FIG. 15 shows the relationship between the regions of the pattern electrode 18d of the liquid crystal optical element 4 for correcting astigmatism and the voltages applied to the respective regions in the fourth exemplary embodiment. Here, the voltage applied to the entire surface electrode of the liquid crystal optical element 4 is defined as the voltage V4.

Moreover, out of the regions of the pattern electrode 18d of the liquid crystal optical element 4, the region 20a is defined as a reference region, and the voltage applied to the reference region is defined as the voltage V1. Note that V1+V4=V0. That is, the voltage V0 is applied between the entire surface electrode and the reference region 20a of the pattern electrode 18d. Therefore, the phase of light transmitted through the reference region 20a of the liquid crystal optical element 4 is Φ0. As shown in FIG. 15, the voltage applied to the regions 20j and 20n is V1+Vα, the voltage applied to the regions 20k and 20o is V1+Vβ, the voltage applied to the regions 20l and 20p is V1−Vα, and the voltage applied to the regions 20m and 20q is V1−Vβ. Further, the voltage applied to the regions 21j and 21n is V1+K·Vα, the voltage applied to the regions 21k and 21o is V1+K·Vβ, the voltage applied to the regions 21l and 21p is V1−K·Vα, and the voltage applied to the regions 21m and 21q is V1−K·Vβ.

Here, assuming that the voltage Vβ=0 for simplicity, for Vα>0, light transmitted through the regions 20j and 20n of the liquid crystal optical element 4 is advanced in phase with respect to the light transmitted through the reference region 20a of the liquid crystal optical element 4, light transmitted through the regions 21j and 21n of the liquid crystal optical element 4 is further advanced in phase, light transmitted through the regions 20l and 20p of the liquid crystal optical element 4 is delayed in phase, light transmitted through the regions 21l and 21p of the liquid crystal optical element 4 is further delayed in phase, and light transmitted through the regions 20k, 20m, 20o, 20q, 21k, 21m, 21o, and 21q of the liquid crystal optical element 4 is equal in phase. Moreover, for Vα<0, light transmitted through the regions 20j and 20n of the liquid crystal optical element 4 is delayed in phase with respect to the light transmitted through the reference region 20a of the liquid crystal optical element 4, light transmitted through the regions 21j and 21n of the liquid crystal optical element 4 is further delayed in phase, the light transmitted through the regions 20l and 20p of the liquid crystal optical element 4 is advanced in phase, the light transmitted through the region 21l and 21p of the liquid crystal optical element 4 is further advanced in phase, and light transmitted through the regions 20k, 20m, 20o, 20q, 21k, 21m, 21o, and 21q of the liquid crystal optical element 4 is equal in phase. Therefore, a change in the value of the voltage Vα causes a change in the correction amount of astigmatism between the 0° and 90° directions. The signs of correctable astigmatism for Vα>0 and Vα<0 are opposite to each other. The absolute value of the amount of correctable astigmatism is increased with the increase in the absolute value of the voltage Vα.

Assuming that the voltage Vα=0, on the other hand, for Vβ>0, light transmitted through the regions 20k and 20o of the liquid crystal optical element 4 is advanced in phase with respect to the light transmitted through the reference region 20a of the liquid crystal optical element 4, light transmitted through the regions 21k and 21o of the liquid crystal optical element 4 is further advanced in phase, light transmitted through the regions 20m and 20q of the liquid crystal optical element 4 is delayed in phase, light transmitted through the regions 21m and 21q of the liquid crystal optical element 4 is further delayed in phase, and light transmitted through the regions 20j, 20l, 20n, 20p, 21j, 21l, 21n, and 21p of the liquid crystal optical element 4 is equal in phase. Moreover, for Vβ<0, light transmitted through the regions 20k and 20o of the liquid crystal optical element 4 is delayed in phase with respect to the light transmitted through the reference region 20a of the liquid crystal optical element 4, light transmitted through the regions 21k and 21o of the liquid crystal optical element 4 is further delayed in phase, the light transmitted through the regions 20*m* and 20*q* of the liquid crystal optical element 4 is advanced in phase, light transmitted through the regions 21*m* and 21*q* of the liquid crystal optical element 4 is further advanced in phase, and light transmitted through the regions 20*j*, 20*l*, 20*n*, 20*p*, 21*j*, 21*l*, 21*n*, and 21*p* of the liquid crystal optical element 4 is equal in phase. Therefore, a change in the value of the voltage Vβ causes a change in the correction amount of astigmatism between the 45° and 135° directions. The signs of correctable astigmatism for Vβ>0 and when Vβ<0 are opposite to each other. The absolute value of the amount of correctable astigmatism is increased with the increase in the absolute value of the voltage V1.

Although the above is described with an assumption that Vβ=0 or Vα=0 for simplicity, however, the voltages Vα and Vβ may be changed within a range in which K times the sum of the absolute values of the voltage Vα and Vβdoes not exceed the voltage ΔV. That is, the voltages Vαand Vβ are set so that it holds |K·Vα|+|K·Vβ|≦ΔV.

A description will be given of waveforms of the voltages applied to the respective regions of the pattern electrode 18*d* of the liquid crystal optical element 4 for correcting astigmatism in the fourth exemplary embodiment. Similarly to the waveforms shown in FIGS. 7A to 7E and FIGS. 11A to 11E, in-phase rectangular wave voltages having a frequency of approximately one kilohertz are applied to the respective regions. The region 20*a* of the pattern electrode 18*d* of the liquid crystal optical element 4 is applied with a rectangular wave voltage with an amplitude of ±V1, and the effective voltage thereof is V1. The regions 20*j* and 20*n* are applied with a rectangular wave voltage with an amplitude of ±(V1+Vα), and the effective voltage thereof is (V1+Vα). The regions 20*k* and 20*o* are applied with a rectangular wave voltage with an amplitude of ±(V1+Vβ), and the effective voltage thereof is (V1+Vβ). The regions 20*l* and 20*p* are applied with a rectangular wave voltage with an amplitude of ±(V1−Vα), and the effective voltage thereof is (V1−Vα). The regions 20*m* and 20*q* are applied with a rectangular wave voltage with an amplitude of ±(V1−Vβ), and the effective voltage thereof is (V1−Vβ). The regions 21*j* and 21*n* are applied with a rectangular wave voltage with an amplitude of ±(V1+K·Vα), and the effective voltage thereof is (V1+K·Vα). The regions 21*k* and 21*o* are applied with a rectangular wave voltage with an amplitude of ±(V1+K·Vβ), and the effective voltage thereof is (V1+K·Vβ). The regions 21*l* and 21*p* are applied with a rectangular wave voltage with an amplitude of ±(V1−K·Vα), and the effective voltage thereof is (V1−K·Vα). The regions 21*m* and 21*q* are applied with a rectangular wave voltage with an amplitude of ±(V1−K·Vβ), and the effective voltage thereof is (V1−K·Vβ). The waveform of the voltage applied to the entire surface electrode of the liquid crystal optical element 4 for correcting astigmatism is same as that shown in FIG. 8.

As described above, for the liquid crystal optical element 4 for correcting astigmatism, the electrode 24*a* in the liquid crystal optical element 4 is selected as any of the pattern electrodes 18*a* to 18*d* having a pattern for correcting astigmatism, and the electrode 24*b* is formed as an entire surface electrode. Structuring the electrode 24*b* in the liquid crystal optical element 4 as a pattern electrode having a pattern for correcting coma aberration or spherical aberration allows the liquid crystal optical element 4 to serve as a liquid crystal optical element for correcting coma aberration or spherical aberration in addition to astigmatism.

Fifth Exemplary Embodiment

Next, a description if given of a fifth exemplary embodiment in which the liquid crystal optical element 4 provide correction of coma aberration correction in addition to astigmatism. The liquid crystal optical element 4 for correcting coma aberration in addition to astigmatism is structured to have a liquid crystal polymer sandwiched between two substrates. On the surface of one of the substrates on the liquid crystal polymer side, the pattern electrode 18*a* having a pattern for correcting astigmatism is formed, and on the surface of the other substrate on the liquid crystal polymer side, a pattern electrode 18*e* having a pattern for correcting coma aberration is formed.

Figure 16:
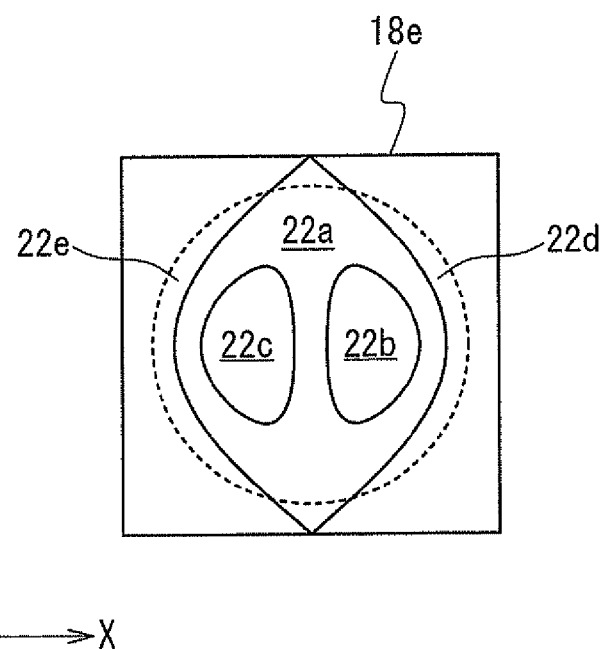
FIG. 16 is a plan view of a pattern electrode of a liquid crystal optical element for correcting coma aberration in a fifth exemplary embodiment of the present invention.

FIG. 16 is a plan view of the pattern electrode 18*e* of the liquid crystal optical element 4 for correcting coma aberration. In the figure, X and Y axes respectively correspond to the radial and tangential directions of the disk 7. The pattern electrode 18*e* is divided into five regions positioned in symmetry with respect to the Y-axis passing through the optical axis. Specifically, the pattern electrode 18*e* is divided into: (2) regions 22*b* and 22*c* spaced apart from each other with an islands structure at positions in symmetry with respect to a straight line directed in parallel to the Y axis passing through the optical axis; a region 22*a* provided to surround these regions 22*b* and 22*c*; and (5) regions 22*d* and 22*e* which are provided outside the region 22*a* in symmetry with respect to the straight line directed in parallel to the Y-axis direction passing through the optical axis, and are respectively positioned on the same side as the regions 22*b* and 22*c* with respect to the straight line directed in parallel to the Y-axis direction passing through the optical axis. The dotted line in the figure corresponds to the effective diameter of the objective lens 6. Moreover, sectional views of the liquid crystal optical element 4 are same as those shown in FIGS. 4A to 4C. It should be noted that the electrode 24*a* is the pattern electrode 18*a* having a pattern for correcting astigmatism, and that the electrode 24*b* is the pattern electrode 18*e* having a pattern for correcting coma aberration.

FIGS. 17A to 17D show wave aberration when coma aberration is corrected by the liquid crystal optical element 4. FIGS. 17A to 17D show the wave aberration on the cross section in the X-axis direction passing through the optical axis. Solid lines of FIGS. 17A and 17B indicate the wave aberration caused by coma aberration to be corrected. The liquid crystal optical element drive circuit 15 controls voltages applied to the pattern electrode 18*e* of the liquid crystal optical element 4 to thereby generate the wave aberration for correction. Dotted lines of FIGS. 17A and 17B indicate the wave aberration caused by the liquid crystal optical element 4 configured to correct the coma aberration. Solid lines of FIGS. 17C and 17D indicate remaining wave aberration when the coma aberration is corrected by the liquid crystal optical element 4.

Figure 17A:
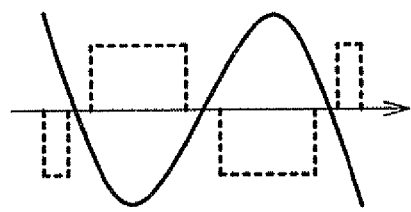
FIGS. 17A to 17D are diagrams showing wave aberration when coma aberration is corrected by the liquid crystal optical element in the fifth exemplary embodiment of the present invention.
Figure 17C:
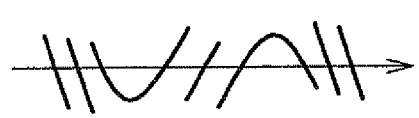

When the coefficient of X ($X^2+Y^2$), which indicates the wave aberration caused by the coma aberration to be corrected, is negative, as shown by a solid line in FIG. 17A, the wave aberration on the cross section in the X-axis direction passing through the optical axis changes in the form of a cubic function, i.e., to positive values, to negative values, to positive values, and to negative values as it goes from the negative side to the positive side of the X-axis. When the spherical aberration is corrected by the liquid crystal optical element 4, as shown by the dotted line in FIG. 17A, the wave aberration caused by the liquid crystal optical element 4 that corrects the coma aberration on the cross section in the X-axis direction passing through the optical axis changes in a stair case pattern, i.e., to a negative value, to 0, to a positive value, to 0, to the negative value, to 0, and to the positive value as it goes from the negative side to the positive side of the X-axis. When the amount of the coma aberration corrected by the liquid crystal optical element 4 is optimally determined, the RMS of the remaining wave aberration is minimized after the coma aberration correction. FIG. 17C shows the remaining wave aberration on the cross section in the X-axis direction passing through the optical axis in this condition, that is, the superposition of the wave aberration indicated by the solid line and the wave aberration indicated by the dotted line in FIG. 17A. As is understood from FIG. 17C, the absolute value of the remaining wave aberration on the cross section in the X-axis direction passing through the optical axis is reduced to around 0.

Figure 17B:
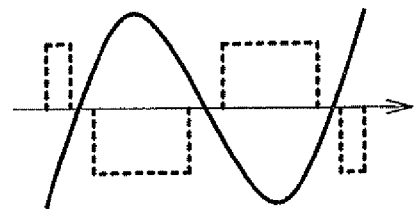
Figure 17D:
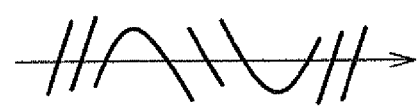

If the coefficient of $X(X^2+Y^2)$, which indicates the wave aberration caused by the coma aberration to be corrected is positive, as shown by a solid line in FIG. 17B, the wave aberration on the cross section in the X-axis direction passing through the optical axis changes in the form of a cubic function, i.e., to negative values, to positive values, to negative values, to positive values as it goes from the negative side to the positive side of the X-axis. As shown by a dotted line in FIG. 17B, the wave aberration caused by the liquid crystal optical element 4 that corrects the coma aberration on the cross section in the X-axis direction passing through the optical axis changes in a stair case pattern, i.e., to a positive value, to 0, to a negative value, to 0, to the positive value, to 0, to the negative value, as it goes from the negative side to the positive side of the X-axis. When the amount of the coma aberration corrected by the liquid crystal optical element 4 is optimally determined, the RMS of the remaining wave aberration is minimized after coma aberration correction. FIG. 17D shows the remaining wave aberration on the cross section in the X-axis direction passing through the optical path in this condition, that is, the superposition of the wave aberration indicated by the solid line and the wave aberration indicated by the dotted line in FIG. 17B. As is understood from FIG. 17D, the absolute value of the remaining wave aberration on the cross section in the X-axis direction passing through the optical axis is reduced to around 0.

The relationship between the voltages applied to the electrode of the liquid crystal optical element 4 and the phase of light transmitted through the liquid crystal optical element 4 is same as shown in FIG. 5. Here, for simplicity, it is assumed that all the regions of the pattern electrode 18a of the liquid crystal optical element 4 are applied with the voltage V1. Moreover, out of the regions of the pattern electrode 18e of the liquid crystal optical element 4, at least one region, for example, the region 22a is defined as a reference region, and the voltage applied to the reference region is defined as V2. It should be noted that V1+V2=V0. That is, the voltage between the pattern electrode 18a and the reference region of the pattern electrode 18e is V0, and the phase of light transmitted through the liquid crystal optical element 4 in the reference region is Φ0. If the voltage applied to a region other than the reference region out of the respective regions of the pattern electrode 18e of the liquid crystal optical element 4 is lower (the absolute value is larger) than V2, the voltage between the pattern electrode 18a and the pattern electrode 18e is increased above V0, and the phase of light transmitted through the liquid crystal optical element 4 in this region is advanced with respect to Φ0. That is, the light transmitted through this region of the liquid crystal optical element 4 experiences positive wave aberration with respect to the light transmitted through the reference region of the liquid crystal optical element 4. On the other hand, if the voltage applied to a region other than the reference region out of the respective regions of the pattern electrode 18e of the liquid crystal optical element 4 is higher (the absolute value thereof is smaller) than V2, the voltage between the pattern electrode 18a and the pattern electrode 18e is reduced below V0, and the phase of the light transmitted through this region of the liquid crystal optical element 4 is delayed with respect to Φ0. That is, the light transmitted through this region of the liquid crystal optical element 4 experiences negative wave aberration with respect to the light transmitted through the reference region of the liquid crystal optical element 4.

Figures 18, 19:
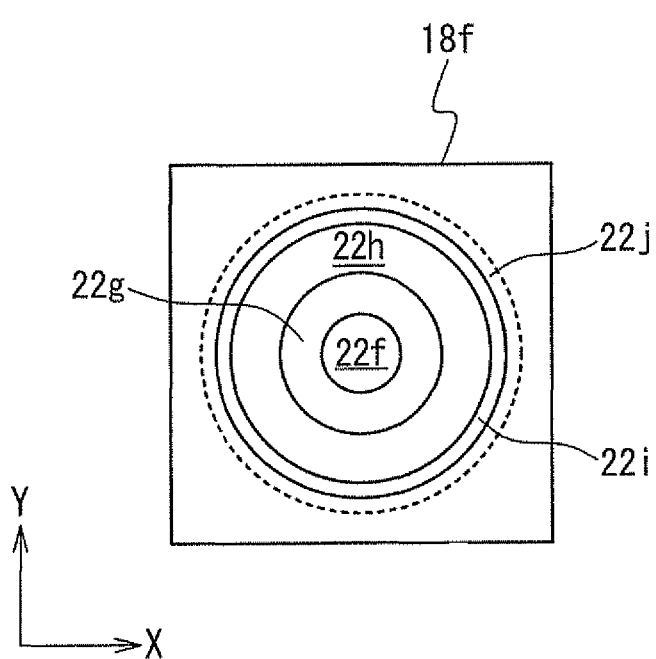
FIG. 18 is a diagram showing relationship between regions of the pattern electrode of the liquid crystal optical element for correcting coma aberration and applied voltages in the fifth exemplary embodiment.
FIG. 19 is a plan view of a pattern electrode of a liquid crystal optical element for correcting spherical aberration in a sixth exemplary embodiment of the present invention.

FIG. 18 shows the relationship between the regions of the pattern electrode 18e of the liquid crystal optical element 4 for correcting coma aberration and the voltages applied to the respective regions. For simplicity, it is assumed that the voltages applied to the respective regions of the pattern electrode 18a of the liquid crystal optical element 4 are all set to V1. That is, it is assumed that Vα=0 and Vβ=0. Moreover, out of the regions of the pattern electrode 18e of the liquid crystal optical element 4, the region 22a is defined as a reference region, and the voltage applied to the reference region 22a is defined as V2. It should be noted that V1+V2=V0. The voltage applied to the regions 22b and 22e is V2−Vγ, and the voltage applied to the regions 22c and 22d is V2+Vγ.

For Vγ>0, light transmitted through the regions 22b and 22e of the liquid crystal optical element 4 is delayed in phase with respect to light transmitted through the reference region 22a of the liquid crystal optical element 4, and light transmitted through the regions 22c and 22d of the liquid crystal optical element 4 is advanced in phase. For Vγ<0, on the other hand, light transmitted through the regions 22b and 22e of the liquid crystal optical element 4 is advanced in phase with respect to the light transmitted through the reference region 22a of the liquid crystal optical element 4, and the light transmitted through the regions 22c and 22d of the liquid crystal optical element 4 is delayed in phase. As thus described, a change in the voltage Vγ causes a change in the correction amount of coma aberration. The signs of correctable coma aberration for Vγ>0 and Vγ<0 are opposite to each other. The absolute value of the amount of correctable coma aberration is increased with the increase in the absolute value of the voltage Vγ.

Although the above is described with an assumption that Vα=0 or Vβ=0, for simplicity, the voltages Vα, Vβ, and Vγ may be actually changed within a range in which the sum of the respective absolute values of these voltages does not exceed ΔV. That is, the voltages Vα, Vβ, and Vγ are set so that it holds |Vα|+|Vβ|+|Vγ|≦ΔV.

Although a description is given of a case in which the pattern electrode 18e of the liquid crystal optical element 4 has a pattern for correcting coma aberration in the X-axis direction with reference to FIGS. 16 to 18, the same applies to a case in which the pattern electrode 18e of the liquid crystal optical element 4 has a pattern for correcting coma aberration in the Y-axis direction.

In the fifth exemplary embodiment, the electrode 24a of the liquid crystal optical element 4 is the pattern electrode 18a having a pattern for correcting astigmatism, and the electrode 24b is the pattern electrode 18e having a pattern for correcting coma aberration. Contrarily, in a possible exemplary embodiment, the electrode 24a of the liquid crystal optical element 4 may be any of the pattern electrodes 18b to 18d having a pattern for correcting astigmatism and the electrode 24b may be the pattern electrode 18e having a pattern for correcting coma aberration.

Sixth Exemplary Embodiment

Next, a description will be given of a sixth exemplary embodiment in which the liquid crystal optical element 4 corrects spherical aberration in addition to astigmatism. The liquid crystal optical element 4 for correcting spherical aberration in addition to astigmatism is structured to have a liquid crystal polymer sandwiched between two substrates. On the surface of one of the substrates on the liquid crystal polymer side, the pattern electrode 18a having a pattern for correcting astigmatism is formed, and on the surface of the other substrate on the liquid crystal polymer side, a pattern electrode 18f having a pattern for correcting spherical aberration is formed.

FIG. 19 is a plan view of the pattern electrode 18f of the liquid crystal optical element 4 for correcting spherical aberration. In the figure, X and Y axes respectively correspond to the radial and tangential directions of the disk 7. The pattern electrode 18f is divided into five regions by four circles with the optical axis serving as center. Specifically, the pattern electrode 18f is divided into regions 22f to 22j with the optical axis as center. The dotted line in the figure corresponds to the effective diameter of the objective lens 6. Moreover, sectional views of the liquid crystal optical element 4 are same as shown in FIGS. 4A to 4C. It should be noted that the electrode 24a is the pattern electrode 18a having a pattern for correcting astigmatism, and that the electrode 24b is the pattern electrode 18f having a pattern for correcting spherical aberration.

FIGS. 20A to 20D show wave aberration when spherical aberration is corrected by the liquid crystal optical element 4. FIGS. 20A to 20D show the wave aberration on the cross section in the X-axis direction passing through the optical axis. It should be noted that wave aberration on the cross section in an arbitrary direction passing through the optical axis is equal to the wave aberration on the cross section in the X-axis direction passing through the optical axis. Solid lines of FIGS. 20A and 20B show the wave aberration caused by spherical aberration to be corrected. The liquid crystal optical element drive circuit 15 controls voltages applied to the pattern electrode 18f of the liquid crystal optical element 4 to thereby generate the wave aberration for correction. Dotted lines of FIGS. 20A and 20B show the wave aberration caused by the liquid crystal optical element 4 that corrects this spherical aberration. Solid lines of FIGS. 20C and 20D show remaining wave aberration when the spherical aberration is corrected by the liquid crystal optical element 4.

If the coefficient of $(X^2+Y^2)^2$, indicating the wave aberration caused by the spherical aberration to be corrected, is negative, as shown by the solid line in FIG. 20A, the wave aberration on the cross section in the X-axis direction passing through the optical axis changes in the form of a quartic function, i.e., to negative values, to positive values, to negative values, to positive values, to negative values as it goes from the negative side to the positive side of the X-axis. When this spherical aberration is corrected by the liquid crystal optical element 4, as shown by the dotted line in FIG. 20A, the wave aberration caused by the liquid crystal optical element 4 on the cross section in the X-axis direction passing through the optical axis changes in a stair case pattern, i.e., to a positive value, to 0, to a negative value, to 0, to the positive value, to 0, to the negative value, to 0, to the positive as it goes from the negative side to the positive side of the X-axis. When the amount of the spherical aberration corrected by the liquid crystal optical element 4 is optimally determined, the RMS of the remaining wave aberration is minimized after the spherical aberration correction. FIG. 20C shows the remaining wave aberration on the cross section in the X-axis direction passing through the optical axis in this case, that is, the sum of the wave aberration indicated by the solid line and the wave aberration indicated by the dotted line in FIG. 20A. As is understood from FIG. 20C, the absolute value of the remaining wave aberration on the cross section in the X-axis direction passing through the optical axis is reduced to around 0.

When the coefficient of $(X^2+Y^2)^2$, which indicates the wave aberration caused by the spherical aberration to be corrected, is positive, as shown by the solid line in FIG. 20B, the wave aberration on the cross section in the X-axis direction passing through the optical axis changes in the form of a quartic function, i.e., to positive values, negative values, to positive values, to negative values, and to positive values as it goes from the negative side to the positive side of the X-axis. As shown by the dotted line in FIG. 20B, the wave aberration caused by the liquid crystal optical element 4 that corrects the spherical aberration on the cross section in the X-axis direction passing through the optical axis changes in a stair case pattern, i.e., to a negative value, to 0, to a positive value, to 0, to the negative value, to 0, to the positive value, to 0, to the negative value as it goes from the negative side to the positive side of the X-axis. When the amount of the spherical aberration corrected by the liquid crystal optical element 4 is optimally determined, the RMS of the remaining wave aberration is minimized after the spherical aberration correction. FIG. 20D shows the remaining wave aberration on the cross section in the X-axis direction passing through the optical axis in this condition, that is, the super position of the wave aberration indicated by the solid line and the wave aberration indicated by the dotted line in FIG. 20B. As is understood from FIG. 20D, the absolute value of the remaining wave aberration on the cross section in the X-axis direction passing through the optical axis is reduced to around 0.

The relationship between the voltages applied to the electrode of the liquid crystal optical element 4 and the phase of light transmitted through the liquid crystal optical element 4 is same as that shown in FIG. 5. Here, it is assumed for simplicity that all the regions of the pattern electrode 18a of the liquid crystal optical element 4 are applied with the voltage V1. Moreover, out of the regions of the pattern electrode 18f of the liquid crystal optical element 4, at least one region, for example, the region 22i is defined as a reference region, and the voltage applied to the reference region is defined as V3. Note that V1+V3=V0. That is, the voltage between the pattern electrode 18a and the reference region of the pattern electrode 18f is V0, and the phase of light transmitted through the reference region of the liquid crystal optical element 4 is Φ0. If the voltage applied to a region other than the reference region out of the respective regions of the pattern electrode 18f of the liquid crystal optical element 4 is lower (its absolute value is larger) than V3, the voltage between the pattern electrode 18a and the pattern electrode 18f is increased above than V0, and the phase of light transmitted through this region of the liquid crystal optical element 4 is advanced with respect to Φ0. That is, the light transmitted through this region of the liquid crystal optical element 4 experiences positive wave aberration with respect to the light transmitted through the liquid crystal optical element 4. On the other hand, when the voltage applied to a region other than the reference region out of the respective regions of the pattern electrode 18f of the liquid crystal optical element 4 is higher (its absolute value is smaller) than V3, the voltage between the pattern electrode 18a and the pattern electrode 18f is increased above V0, and the phase of the light transmitted through this region of the liquid crystal optical element 4 is delayed with respect to Φ0. That is, the light transmitted through this region of the liquid crystal optical element 4 experiences negative wave aberration with respect to the light transmitted through the reference region of the liquid crystal optical element 4.

FIG. 21 shows the relationship between the regions of the pattern electrode 18f of the liquid crystal optical element 4 for correcting spherical aberration and the voltages applied to the respective regions. It is assumed for simplicity that the voltages applied to the respective regions of the pattern electrode 18a of the liquid crystal optical element 4 are all set to V1. That is, it is assumed that Vα=0 and Vβ=0. Moreover, out of the regions of the pattern electrode 18f of the liquid crystal optical element 4, the region 22g and the region 22i are defined as reference regions, and the voltage applied to the reference regions is defined as V3. Note that V1+V3=V0. The voltage applied to the region 22f and the region 22j is V3+Vδ, and the voltage applied to the region 22h is V3−Vδ.

For Vδ>0, light transmitted through the regions 22f and 22j of the liquid crystal optical element 4 is advanced in phase with respect to light transmitted through the reference regions 22g and 22i of the liquid crystal optical element 4, and light transmitted through the region 22h of the liquid crystal optical element 4 is delayed in phase. Moreover, for Vδ<0, light transmitted through the regions 22f and 22j of the liquid crystal optical element 4 is delayed in phase with respect to the light transmitted through the reference regions 22g and 22i of the liquid crystal optical element 4, and light transmitted through the region 22h of the liquid crystal optical element 4 is advanced in phase. As thus described, a change in the voltage Vδ causes a change in the correction amount of spherical aberration. The signs of correctable spherical aberration when Vδ>0 and when Vδ<0 are opposite to each other. The absolute value of the amount of correctable spherical aberration is increased with the increase in the absolute value of the voltage Vδ.

Although the above is described with an assumption that Vα=0 or Vβ=0 for simplicity, the voltages Vα, Vβ, and Vδ may be actually changed within a range such that the sum of the respective absolute values of these voltages does not exceed ΔV. That is, the voltages Vα, Vβ, and Vδ are set so that it holds $|V\alpha|+|V\beta|+|V\delta| \leq \Delta V$.

In the sixth exemplary embodiment, the electrode 24a of the liquid crystal optical element 4 is the pattern electrode 18a having a pattern for correcting astigmatism, and the electrode 24b is the pattern electrode 18f having a pattern for correcting spherical aberration. Contrarily, in possible exemplary embodiments, the electrode 24a of the liquid crystal optical element 4 may be any of the pattern electrodes 18b to 18d having a pattern for correcting astigmatism, and the electrode 24b may be the pattern electrode 18f having a pattern for correcting spherical aberration.

Figure 22A:
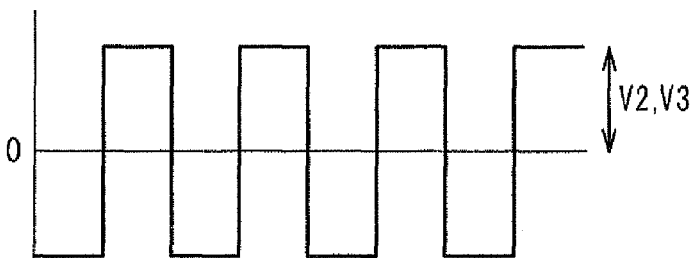
FIGS. 22A to 22C are diagrams showing waveforms of the voltages applied to the respective regions of the pattern electrode of the liquid crystal optical element for correcting coma aberration or spherical aberration in the fifth and sixth exemplary embodiments of the present invention.
Figure 22B:
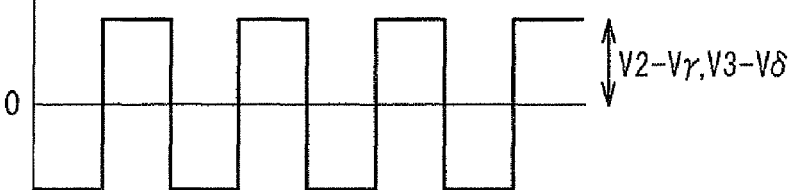
Figure 22C:
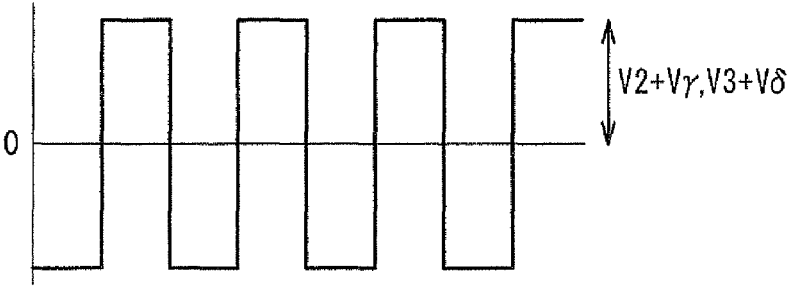

FIGS. 22A to 22C show waveforms of the voltages applied to the respective regions of the pattern electrodes 18e or 18f of the liquid crystal optical element 4 for correcting coma aberration or spherical aberration. In FIGS. 22A to 22C, the horizontal axis denotes time, and the vertical axis denotes the voltage. Long-term application of a dc voltage to the electrode of the liquid crystal optical element causes destruction of the liquid crystal polymer. Thus, an ac voltage is actually applied. As shown in FIGS. 22A to 22C, the respective regions of the pattern electrodes 18e and 18f are applied with in-phase rectangular wave voltages having a frequency of approximately one kilohertz. These rectangular voltages are opposite in phase to the rectangular voltages applied to the regions 19a to 19i of the pattern electrode 18a. As shown in FIG. 22A, the region 22a of the pattern electrode 18e of the liquid crystal optical element 4 is applied with a rectangular wave voltage with an amplitude of ±V2, and the effective voltage thereof is V2. As shown in FIG. 22B, the regions 22b and 22e are applied with a rectangular wave voltage with an amplitude of ±(V2−Vγ), and the effective voltage thereof is (V2−Vγ). As shown in FIG. 22C, the regions 22c and 22d are applied with a rectangular wave voltage with an amplitude of ±(V2+Vγ), and the effective voltage thereof is (V2+Vγ).

Moreover, as shown in FIG. 22A, the regions 22g and 22i of the pattern electrode 18f of the liquid crystal optical element 4 are applied with a rectangular wave voltage with an amplitude of V3, and the effective voltage thereof is V3. As shown in FIG. 22B, the region 22h is applied with a rectangular wave voltage with an amplitude of ±(V3−Vδ) and the effective voltage thereof is (V3−Vδ). As shown in FIG. 22C, the regions 22f and 22j are applied with a rectangular wave voltage with an amplitude of ±(V3+Vδ), and the effective voltage thereof is (V3+Vδ). The waveforms of the voltages applied to the regions 22f to 22j are equal in phase, but the phase thereof is opposite to the waveforms of the voltages applied to the regions 19a to 19i of the pattern electrode 18a of the liquid crystal optical element 4.

Next, a description is given of an optical information recording/reproducing method according to an exemplary embodiment of the present invention. In correcting astigmatism by the liquid crystal optical element 4, the optimum value of the voltage Vα is determined with the voltage Vβ fixed at a predetermined value, so that the quality evaluation index of the reproduced signal from the optical recording medium is best improved. In addition, the optimum value of the voltage Vβ is determined with the voltage Vα fixed at a predetermined value, so that the quality evaluation index of the reproduced signal from the optical recording medium is best improved. It should be noted that whichever of the step for determining the optimum value of the voltage Vα with the voltage Vβ fixed at the predetermined value and the step for determining the optimum value of the voltage Vβ with the voltage Vα fixed at the predetermined value may be carried out first.

Determining the optimum value of the voltage Vα with the voltage Vβ fixed at the predetermined value so that the quality evaluation index of the reproduced signal from the optical recording medium is best improved allows obtaining the optimum correction amount for the astigmatism between the 0° and 90° directions. Moreover, determining the optimum value of the voltage Vβ with the voltage Vα fixed at a predetermined value so that the quality evaluation index of the reproduced signal from the optical recording medium is best improved allows obtaining the optimum correction amount for the astigmatism between the 45° and 135° directions. After the combination of the optimum value of the voltage Vα and the optimum value of the voltage Vβ is determined, the rectangular voltages are applied to the respective regions of the pattern electrode 18 of the liquid crystal optical element 4 on the basis of this combination. Specifically, the respective regions of the pattern electrode 18a of the liquid crystal optical element 4 are applied with rectangular voltages having the effective voltages shown in FIG. 6. Alternatively, the respective regions of the pattern electrode 18b of the liquid crystal optical element 4 are applied with rectangular voltages having the effective voltages shown in FIG. 10. Alternatively, the respective regions of the pattern electrode 18c of the liquid crystal optical element 4 are applied with rectangular voltages having the effective voltages shown in FIG. 13. Alternatively, the respective regions of the pattern electrode 18d of the liquid crystal optical element 4 are applied with rectangular voltages having the effective voltages shown in FIG. 15 are applied. This allows correcting the astigmatism between the 0° and 90° directions and the astigmatism between the 45° and 135° directions, simultaneously. That is, astigmatism of an arbitrary direction and amount can be corrected. Under this condition, the quality of the reproduced signal from the optical recording medium is best improved.

When coma aberration or spherical aberration is corrected in addition to astigmatism, the liquid crystal optical element 4 is configured to include the pattern electrodes 18a and 18e or the pattern electrodes 18a and 18f as the electrodes 24a and 24b. First, the optimum value of the voltage $V\alpha$ is determined with the voltage $V\beta$ and the voltage $V\gamma$ or the voltage $V\delta$ fixed at predetermined values so that the quality evaluation index of the reproduced signal from the optical recording medium is best improved. With the voltage $V\alpha$ and the voltage $V\gamma$ or the voltage $V\delta$ fixed at predetermined values, the optimum value of the voltage $V\beta$ is determined so that the best quality evaluation index of a reproduced signal from the optical recording medium is provided. Next, the optimum value of the voltage $V\gamma$ or the voltage $V\delta$ is determined with the voltages $V\alpha$ and $V\beta$ fixed at predetermined values, so that the quality evaluation index of a reproduced signal from the optical recording medium is best improved. Here, any of the step for determining the optimum value of the voltage $V\alpha$ with the voltage $V\beta$ and the voltage $V\gamma$ or the voltage $V\delta$ fixed at the predetermined values, the step for determining the optimum value of the voltage $V\beta$ with the voltage $V\alpha$ and the voltage $V\gamma$ or the voltage $V\delta$ fixed at the predetermined values, and the step for determining the optimum value of the voltage $V\gamma$ or the voltage $V\delta$ with the voltages $V\alpha$ and $V\beta$ fixed at the predetermined values may be carried out first.

Determining the optimum value of the voltage $V\alpha$ with the voltage $V\beta$ and the voltage $V\gamma$ or the voltage $V\delta$ fixed at the predetermined values so that the quality evaluation index of the reproduced signal from the optical recording medium is best improved, allows obtaining the optimum correction amount for the astigmatism between 0° and 90° directions. In addition, determining the optimum value of the voltage $V\beta$ with the voltage $V\alpha$ and the voltage $V\gamma$ or the voltage $V\delta$ fixed at the predetermined values so that the quality evaluation index of the reproduced signal from the optical recording medium is best improved allows obtaining the optimum correction amount for the astigmatism between the 45° and 135° directions. Further, determining the optimum value of the voltage $V\gamma$ or the voltage $V\delta$ with the voltages $V\alpha$ and $V\beta$ fixed at the predetermined values so that the quality evaluation index of the reproduced signal from the optical recording medium is best improved allows obtaining the optimum correction amount for coma aberration or spherical aberration.

After the combination of the optimum value of the voltages $V\alpha$, $V\beta$, and the optimum value of the voltage $V\gamma$ or $V\delta$ is determined, the rectangular voltages are applied to the respective regions of the pattern electrode 18 of the liquid crystal optical element 4 on the basis of the determined combination. Specifically, the respective regions of the pattern electrode 18a of the liquid crystal optical element 4 are applied with rectangular voltages having the effective voltages shown in FIG. 6. Alternatively, the respective regions of the pattern electrode 18b of the liquid crystal optical element 4 are applied with rectangular voltages having the effective voltages shown in FIG. 10. Alternatively, the respective regions of the pattern electrode 18c of the liquid crystal optical element 4 are applied with rectangular voltages having the effective voltages shown in FIG. 13. Alternatively, the respective regions of the pattern electrode 18d of the liquid crystal optical element 4 are applied with rectangular voltages having the effective voltages shown in FIG. 15. In addition, the respective regions of the pattern electrode 18e of the liquid crystal optical element 4 are applied with rectangular voltages having the effective voltages shown in FIG. 18, or the respective regions of the pattern electrode 18f of the liquid crystal optical element 4 are applied with rectangular voltages having the effective voltages shown in FIG. 21. As a result, the astigmatism between the 0° and 90° directions, the astigmatism between the 45° and 135° directions, and coma aberration or spherical aberration are corrected simultaneously. That is, astigmatism and coma aberration or spherical aberration of an arbitrary direction and amount can be corrected. Under this condition, the quality of the reproduced signal from the optical recording medium is best improved.

As the quality evaluation index of the reproduced signal, for example, any of an amplitude of a reproduced signal, jitter, PRSNR (Partial Response Signal to Noise Ratio), an error rate and so on may be used.

FIGS. 24 to 27 show measurement examples of the quality evaluation index of the reproduced signal by the optical information recording/reproducing method of the present invention.

Figure 24A:
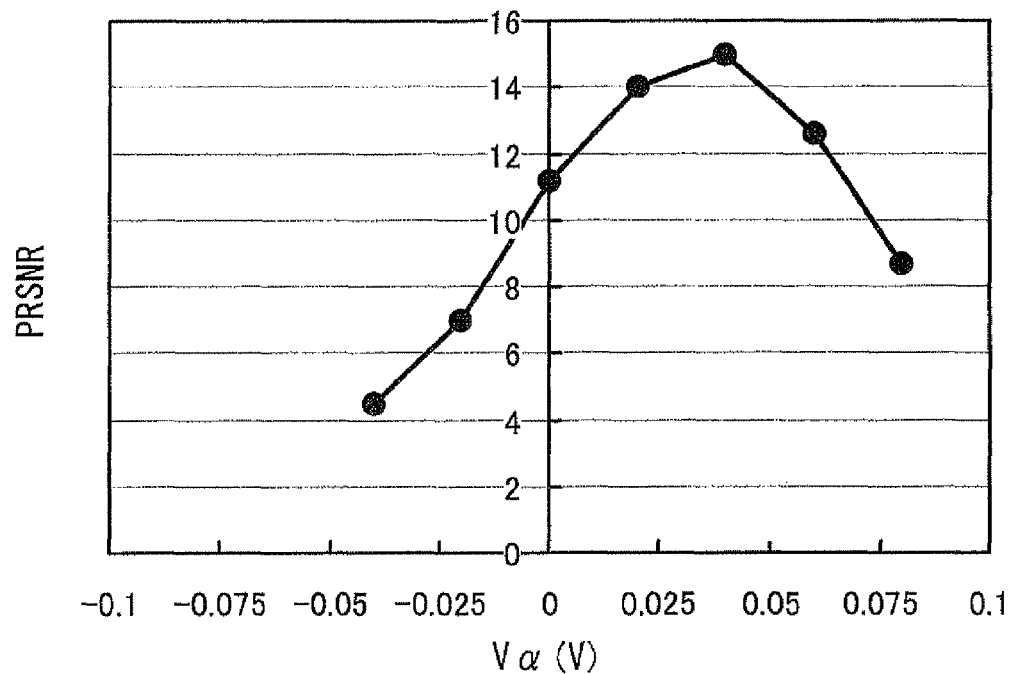
FIGS. 24A and 24B are diagrams showing an example of measurement of a quality evaluation index of a reproduced signal by an optical information recording/reproducing method of the present invention.
Figure 24B:
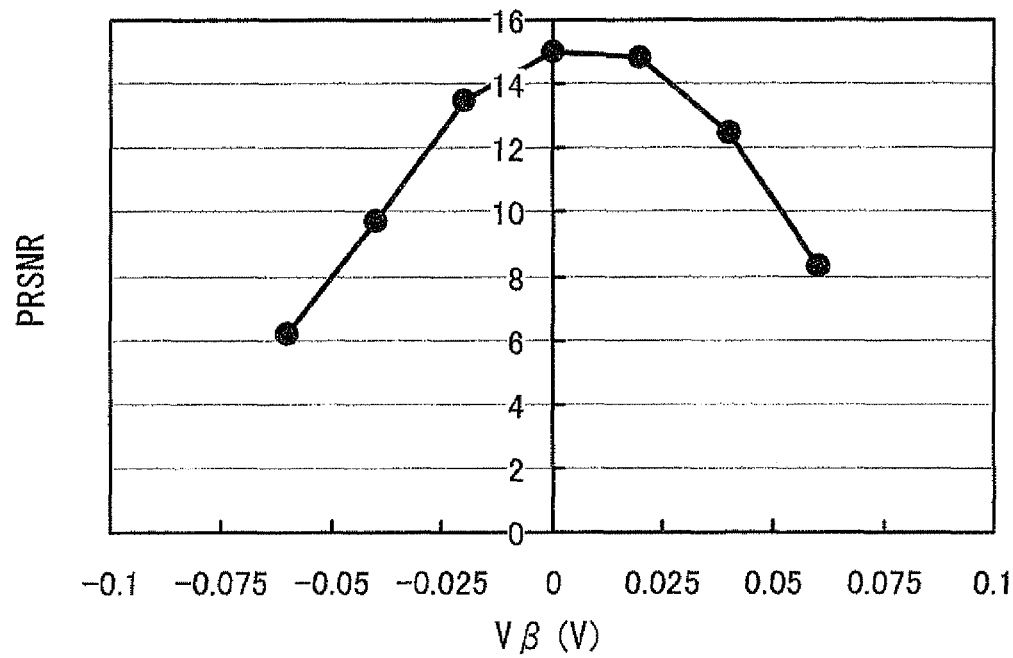

FIGS. 24A and 24B show the measurement examples of in connection with the correction of astigmatism in the first exemplary embodiment. The liquid crystal optical element 4 for correcting astigmatism is used, the optical recording medium is an HD DVD-ROM, and the quality evaluation index of the reproduced signal is the PRSNR. In FIG. 24A, the voltage $V\alpha$ is varied with the voltage the $V\beta$ fixed at 0 volts to measure the relationship between the voltage $V\alpha$ and PRSNR. As is understood From FIG. 24A, the voltage $V\alpha$ to minimize the PRSNR is 0.04 volts, and the value of the PRSNR in this condition is approximately 15. In FIG. 24B, the voltage $V\beta$ is varied with the voltage $V\alpha$ fixed at 0.04 volts as obtained in FIG. 24A to measure the relationship between the voltage $V\beta$ and the PRSNR. As is understood from FIG. 24B, the voltage $V\beta$ to minimize the PRSNR is 0 volts, and the value of the PRSNR in this condition is approximately 15. In this case, the combination of the optimum values of the voltages $V\alpha$ and $V\beta$ to minimize the PRSN is 0.04 volts and 0 volts.

Figure 25A:
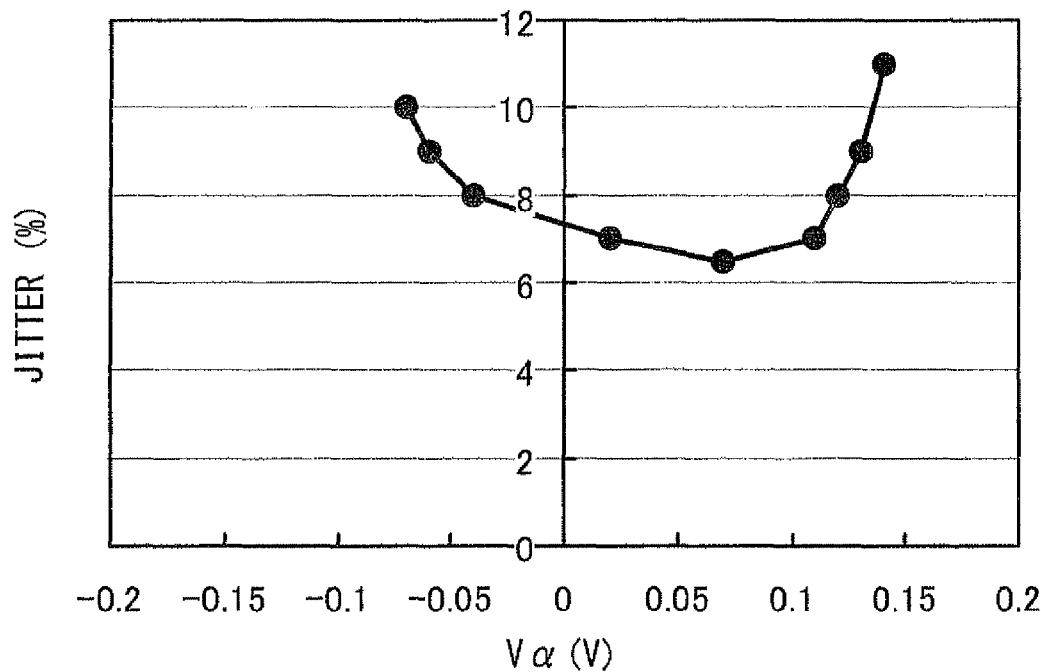
FIGS. 25A and 25B are diagrams showing an example of measurement of the quality evaluation index of the reproduced signal by the optical information recording/reproducing method of the present invention.
Figure 25B:
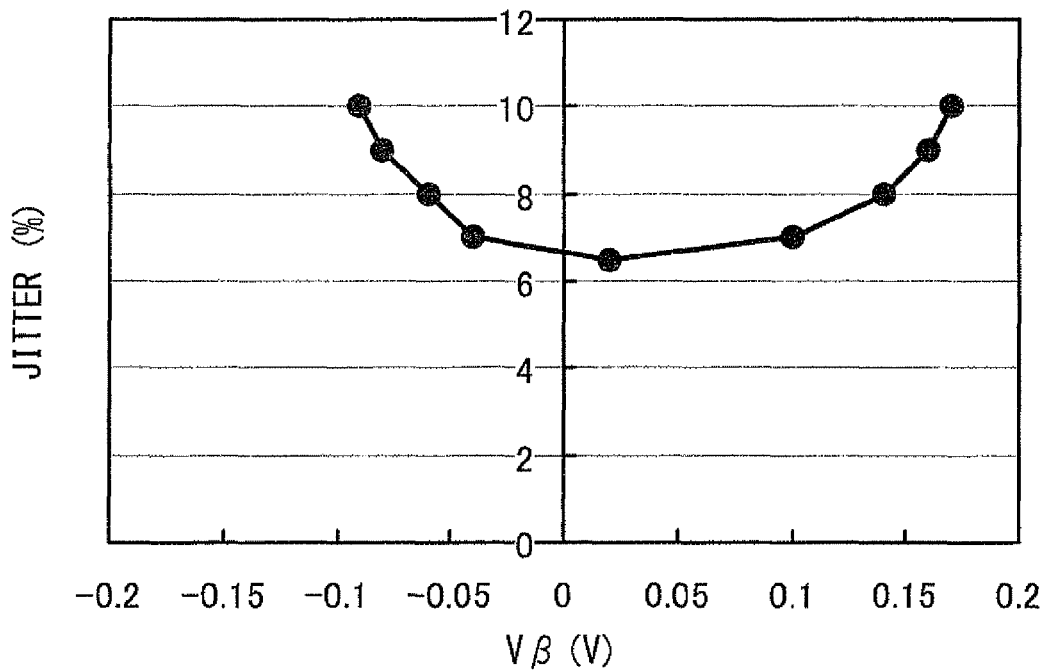

FIGS. 25A and 25B show the examples of measurement in connection with the correction of astigmatism in the first exemplary embodiment when the jitter is used as the quality evaluation index of the reproduced signal. The liquid crystal optical element 4 for correcting astigmatism is used, and the optical recording medium is DVD-ROM. In FIG. 25A the voltage $V\alpha$ is varied with the voltage the $V\beta$ fixed at 0 volts to measure the relationship between the voltage $V\alpha$ and the jitter. As is understood from FIG. 25A, the voltage $V\alpha$ to minimize the jitter is 0.07 volts, and the value of the jitter in this condition is approximately 6.5%. In FIG. 25B, the voltage $V\beta$ is varied with the voltage $V\alpha$ fixed at 0.07 volts as obtained in FIG. 25A, to measure the relationship between the voltage $V\beta$ and the jitter. As is understood from FIG. 25B, the voltage $V\beta$ to minimize the jitter is 0.02 volts, and the jitter in this condition is approximately 6.5%. In this case, the combination of the optimum values of the voltages $V\alpha$ and $V\beta$ to minimize the jitter is 0.07 volts and 0.02 volts.

Figure 26:
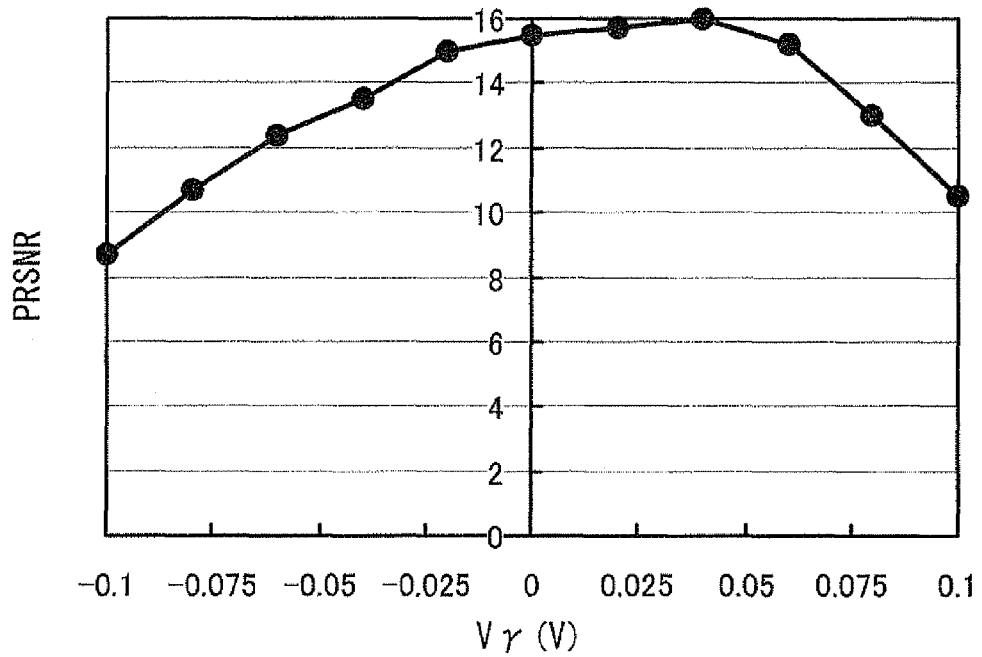
FIG. 26 is a diagram showing an example of measurement of the quality evaluation index of the reproduced signal by the optical information recording/reproducing method of the present invention.

FIG. 26 shows a measurement example in connection with the correction of coma aberration in the fifth exemplary embodiment. The liquid crystal optical element for correcting coma aberration in addition to astigmatism is used, the optical recording medium is an HD DVD-ROM, and the quality evaluation index of the reproduced signal is the PRSNR. In FIG. 26, the voltage $V\gamma$ is varied to measure the relationship between the voltage $V\gamma$ and the PRSNR with the voltage $V\alpha$ fixed at 0.04 volts as obtained in FIG. 24A and with the voltage $V\beta$ fixed at 0 volts as obtained in FIG. 24B. As is understood from FIG. 26, the voltage $V\gamma$ to minimize the PRSNR is 0.04 volts, and the value of the PRSNR in this condition is approximately 16. In this case, the combination of the optimum values of the voltages $V\alpha$, $V\beta$, and $V\gamma$ to minimize the PRSNR is 0.04 volts, 0 volts, and 0.04 volts.

Figure 27:
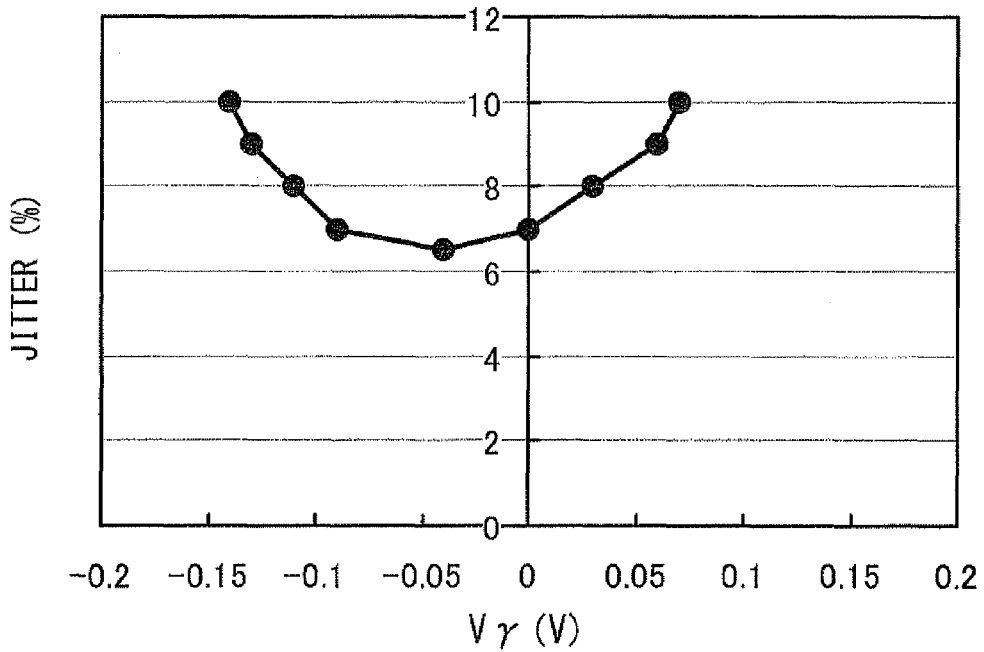
FIG. 27 is a diagram showing an example of measurement of the quality evaluation index of the reproduced signal by the optical information recording/reproducing method of the present invention.
Figure 28:
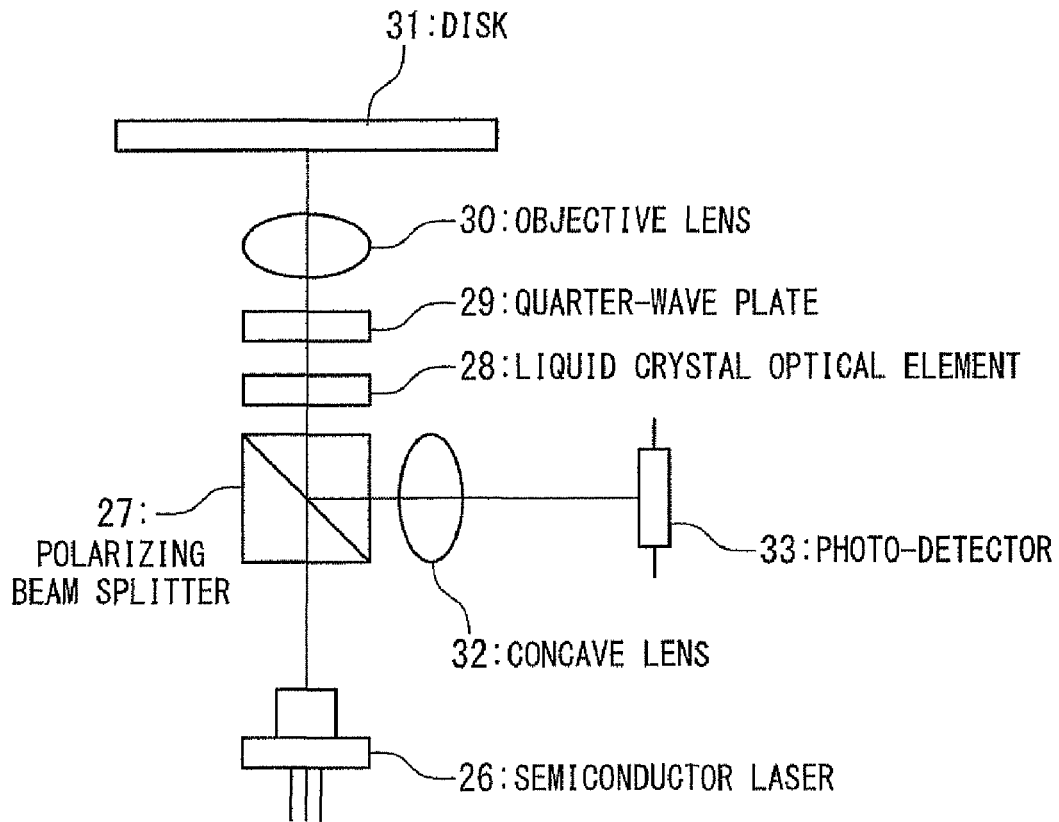
FIG. 28 is a diagram showing a configuration of a conventional optical head provided with a liquid crystal optical element for correcting astigmatism.
Figure 29:
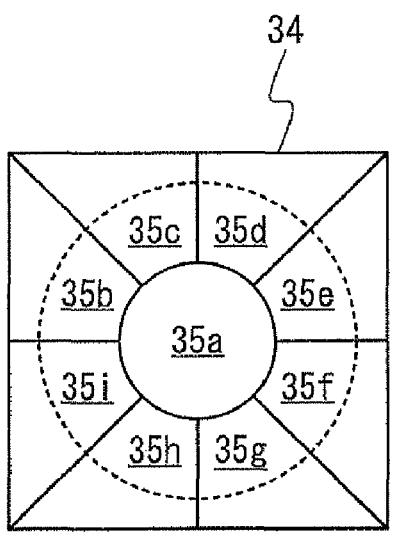
FIG. 29 is a plan view of a pattern electrode of the liquid crystal optical element for correcting astigmatism in the conventional optical head.

FIG. 27 shows a measurement example in connection with the correction of coma aberration in the fifth exemplary embodiment when the jitter is used as the quality evaluation index of the reproduced signal. The liquid crystal optical element 4 for correcting coma aberration in addition to astigmatism is used, and the optical recording medium is a DVD-ROM. In FIG. 27, the voltage Vγ is varied to measure relationship between the voltage Vγ and the jitter with the voltage Vα fixed at 0.07 volts as obtained in FIG. 25A and with the voltage the Vβ fixed at 0.02 volts as obtained in FIG. 25B. As is understood from FIG. 27, the voltage Vγ to minimize the jitter is −0.04 volts, and the value of the jitter in this condition is approximately 6.5%. In this case, the combination of the optimum values of the voltages Vα, Vβ, and Vγ to minimize the jitter is 0.07 volts, 0.02 volts, and −0.04 volts.

The control of the voltages applied to the respective regions of the pattern electrodes of the liquid crystal optical element as thus described allows determining in short time the applied voltages such that the quality of the reproduced signal is best improved.

The invention claimed is:

1. An optical information recording/reproducing apparatus comprising:
an optical head including: a light source; an objective lens focusing an emitted light emitted from said light source on an optical recording medium; a photo-detector receiving a reflected light generated by said emitted light being reflected by said optical recording medium;
a light splitter splitting forward light directed from said light source to said objective lens and backward light directed from said objective lens to said photo-detector; and a liquid crystal optical element which is provided in a light path of said forward light and includes a liquid crystal polymer layer extending perpendicularly to an optical axis; and
a liquid crystal optical element drive unit driving said liquid crystal optical element,
wherein said liquid crystal optical element includes a first pattern electrode provided on one side of said liquid crystal polymer layer in said optical axis direction and divided into a plurality of regions,
wherein said first pattern electrode includes: a first region provided to surround said optical axis, a set of eight partition regions provided outside said first region and defined so as to divide a circumference into eight segments with respect to said optical axis, said set of eight partition regions including second to ninth regions sequentially arranged,
wherein said liquid crystal optical element drive unit is configured:
to apply a first effective voltage to said first region;
to apply a second effective voltage to said second and sixth regions;
to apply a third effective voltage to said third and seventh regions;
to apply a fourth effective voltage to said fourth and eighth regions; and
to apply a fifth effective voltage to said fifth and ninth regions;
wherein an average of said second and fourth effective voltages and an average of said third and fifth effective voltages are equal to said first effective voltage;
wherein said first effective voltage is V1, said second effective voltage is V1+Vα+Vβ, said third effective voltage is V1-Vα+Vβ, said fourth effective voltage is V1-Vα-Vβ, and said fifth effective voltage is V1+Vα-Vβ, where V1 is a first reference voltage value, Vα is a first voltage value, and Vβ is a second voltage value;
wherein an optimum value of said voltage Vβ is determined with said voltage Vα fixed to a predetermined value so that a quality evaluation index of a reproduced signal from said optical recording medium is best improved, and an optimum value of said voltage Vα is determined with said voltage Vβ fixed to a predetermined value so that said quality evaluation index is best improved; and
wherein the predetermined values of Vα and Vβ are not zero.

2. An optical information recording/reproducing apparatus comprising:
an optical head including: a light source; an objective lens focusing an emitted light emitted from said light source on an optical recording medium; a photo-detector receiving a reflected light generated by said emitted light being reflected by said optical recording medium;
a light splitter splitting forward light directed from said light source to said objective lens and backward light directed from said objective lens to said photo-detector; and a liquid crystal optical element which is provided in a light path of said forward light and includes a liquid crystal polymer layer extending perpendicularly to an optical axis; and
a liquid crystal optical element drive unit driving said liquid crstal optical element,
wherein said liquid crystal optical element includes a first pattern electrode provided on one side of said liquid crystal polymer layer in said optical axis direction and divided into a plurality of regions,
wherein said first pattern electrode includes: a first region provided to surround said optical axis, a set of eight partition regions provided outside said first region and defined so as to divide a circumference into eight segments with respect to said optical axis, said set of eight partition regions including second to ninth regions sequentially arranged,
wherein said liquid crystal optical element drive unit is configured:
to apply a first effective voltage to said first region;
to apply a second effective voltage to said second and sixth regions;
to apply a third effective voltage to said third and seventh regions;
to apply a fourth effective voltage to said fourth and eighth regions; and
to apply a fifth effective voltage to said fifth and ninth regions; and
wherein an average of said second and fourth effective voltages and an average of said third and fifth effective voltages are equal to said first effective voltage;
wherein said first effective voltage is V1, said second effective voltage is V1+Vα, said third effective voltage is V1+Vβ, said fourth effective voltage is V1-Vα, and said fifth effective voltage is V1-Vβ, where V1 is a first reference voltage value, Vα is a first voltage value, and Vβ is a second voltage value; and.
wherein the predetermined values of Vα and Vβ are not zero.

3. An optical information recording/reproducing method comprising:
driving a liquid crystal optical element disposed in an optical path of forward light within an optical head, provided with a liquid crystal polymer layer extending perpendicularly to an optical axis and including a first pattern electrode positioned on one side of said liquid crystal polymer layer in said optical axis direction;

generating a reproduced signal based on backward light reflected by an optical recording medium; and controlling drive of said liquid crystal optical element in said driving so that a quality evaluation index of said reproduced signal is best improved, wherein said first pattern electrode includes: a first region provided to surround said optical axis, a set of eight partition regions provided outside said first region and defined so as to divide a circumference into eight segments with respect to said optical axis, said set of eight partition regions including second to ninth regions sequentially arranged, wherein said driving step includes:
applying an effective voltage of $V1$ to said first region,
applying an effective voltage of $V1+V\alpha+V\beta$ to said second and sixth regions;
applying an effective voltage of $V1-V\alpha+V\beta$ to said third and seventh regions;
applying an effective voltage of $V1-V\alpha-V\beta$ to said fourth and eighth regions; and
applying an effective voltage of $V1+V\alpha-V\beta$ to said fifth and ninth regions, where $V1$ is a first reference voltage value, $V\alpha$ is a first voltage value, and $V\beta$ is a second voltage;

wherein an optimum value of said voltage $v\beta$ is determined with said voltage $V\alpha$ fixed to a predetermined value so that a quality evaluation index of a reproduced signal from said optical recording medium is best improved, and an optimum value of said voltage $V\alpha$ is determined with said voltage $V\beta$ fixed to a predetermined value so that said quality evaluation index is best improved; and wherein the predetermined values of $V\alpha$ and $V\beta$ are not zero.

4. The optical information recording/reproducing method according to claim 3, wherein said quality evaluation index is one of an amplitude, jitter, PRSNR and error rate of said reproduced signal.

* * * * *